(12) United States Patent
Fisher et al.

(10) Patent No.: US 9,354,751 B2
(45) Date of Patent: May 31, 2016

(54) INPUT DEVICE WITH OPTIMIZED CAPACITIVE SENSING

(75) Inventors: Joseph Fisher, San Jose, CA (US);
Erturk Kocalar, Sunnyvale, CA (US);
Steven Hotelling, San Jose, CA (US);
David Gutierrez, Fresno, CA (US)

(73) Assignee: Apple Inc., Cupertino, CA (US)

( * ) Notice: Subject to any disclaimer, the term of this patent is extended or adjusted under 35 U.S.C. 154(b) by 1370 days.

(21) Appl. No.: 12/560,846

(22) Filed: Sep. 16, 2009

(65) Prior Publication Data
US 2010/0289759 A1 Nov. 18, 2010

Related U.S. Application Data

(60) Provisional application No. 61/178,936, filed on May 15, 2009.

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01)

(58) Field of Classification Search
None
See application file for complete search history.

(56) References Cited

U.S. PATENT DOCUMENTS

| 1,061,578 A | 5/1913 | Wischhusen et al. |
| 2,063,276 A | 12/1936 | Thomas |
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |
| 3,965,399 A | 6/1976 | Walker et al. |
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |

(Continued)

FOREIGN PATENT DOCUMENTS

| CN | 1139235 | 1/1997 |
| CN | 1455615 | 11/2003 |

(Continued)

OTHER PUBLICATIONS

Zadesky et al, U.S. Office Action mailed Feb. 1, 2011, directed to U.S. Appl. No. 11/882,004; 16 pages.

(Continued)

*Primary Examiner* — K. Wong
(74) *Attorney, Agent, or Firm* — Morrison & Foerster LLP

(57) ABSTRACT

An input device is disclosed that can improve input detection associated with sensor elements that exhibit a weaker response at the lower end of their dynamic range than their counterparts. This can be advantageous when implementing input reporting rules that rely on a sufficient response at the lower end of a sensor element's dynamic range. The input device can compensate for a weak sensor element at the low end of its dynamic range by increasing its sensitivity in certain situations, such as when an adjacent sensor provides a strong input signal, or after the weak sensor element provides a signal level exceeding a noise threshold for example. The sensitivity of the weak sensor element can be increased in a variety of ways, such as by reducing a noise threshold associated with the sensor element or boosting a signal level associated with the sensor element for example.

28 Claims, 18 Drawing Sheets

(56) References Cited

U.S. PATENT DOCUMENTS

| | | | |
|---|---|---|---|
| 4,129,747 A | 12/1978 | Pepper | |
| 4,158,216 A | 6/1979 | Bigelow | |
| 4,242,676 A | 12/1980 | Piguet et al. | |
| 4,246,452 A | 1/1981 | Chandler | |
| 4,264,903 A | 4/1981 | Bigelow | |
| 4,266,144 A | 5/1981 | Bristol | |
| 4,293,734 A | 10/1981 | Pepper, Jr. | |
| D264,969 S | 6/1982 | McGourty | |
| 4,338,502 A | 7/1982 | Hashimoto et al. | |
| 4,380,007 A | 4/1983 | Steinegger | |
| 4,380,040 A | 4/1983 | Posset | |
| 4,394,649 A | 7/1983 | Suchoff et al. | |
| 4,475,008 A | 10/1984 | Doi et al. | |
| 4,570,149 A | 2/1986 | Thornburg et al. | |
| 4,583,161 A | 4/1986 | Gunderson et al. | |
| 4,587,378 A | 5/1986 | Moore | |
| 4,604,786 A | 8/1986 | Howie, Jr. | |
| 4,613,736 A | 9/1986 | Shichijo et al. | |
| 4,644,100 A | 2/1987 | Brenner et al. | |
| 4,719,524 A | 1/1988 | Morishima et al. | |
| 4,734,034 A | 3/1988 | Maness et al. | |
| 4,736,191 A | 4/1988 | Matzke et al. | |
| 4,739,191 A | 4/1988 | Puar | |
| 4,739,299 A | 4/1988 | Eventoff et al. | |
| 4,752,655 A | 6/1988 | Tajiri et al. | |
| 4,755,765 A | 7/1988 | Ferland | |
| 4,764,717 A | 8/1988 | Tucker et al. | |
| 4,771,139 A | 9/1988 | DeSmet | |
| 4,798,919 A | 1/1989 | Miessler et al. | |
| 4,810,992 A | 3/1989 | Eventoff | |
| 4,822,957 A | 4/1989 | Talmage, Jr. et al. | |
| 4,831,359 A | 5/1989 | Newell | |
| 4,849,852 A | 7/1989 | Mullins | |
| 4,856,993 A | 8/1989 | Maness et al. | |
| 4,860,768 A | 8/1989 | Hon et al. | |
| 4,866,602 A | 9/1989 | Hall | |
| 4,876,524 A | 10/1989 | Jenkins | |
| 4,897,511 A | 1/1990 | Itaya et al. | |
| 4,914,624 A | 4/1990 | Dunthorn | |
| 4,917,516 A | 4/1990 | Retter | |
| 4,943,889 A | 7/1990 | Ohmatoi | |
| 4,951,036 A | 8/1990 | Grueter et al. | |
| 4,954,823 A | 9/1990 | Binstead | |
| 4,976,435 A | 12/1990 | Shatford et al. | |
| 4,990,900 A | 2/1991 | Kikuchi | |
| 5,008,497 A | 4/1991 | Asher | |
| 5,036,321 A | 7/1991 | Leach et al. | |
| 5,053,757 A | 10/1991 | Meadows | |
| 5,086,870 A | 2/1992 | Bolduc | |
| 5,125,077 A | 6/1992 | Hall | |
| 5,159,159 A | 10/1992 | Asher | |
| 5,179,648 A | 1/1993 | Hauck | |
| 5,186,646 A | 2/1993 | Pederson | |
| 5,192,082 A | 3/1993 | Inoue et al. | |
| 5,193,669 A | 3/1993 | Demeo et al. | |
| 5,231,326 A | 7/1993 | Echols | |
| 5,237,311 A | 8/1993 | Mailey et al. | |
| 5,278,362 A | 1/1994 | Ohashi | |
| 5,305,017 A | 4/1994 | Gerpheide | |
| 5,313,027 A | 5/1994 | Inoue et al. | |
| D349,280 S | 8/1994 | Kaneko | |
| 5,339,213 A | 8/1994 | O'Callaghan | |
| 5,367,199 A | 11/1994 | Lefkowitz et al. | |
| 5,374,787 A | 12/1994 | Miller et al. | |
| 5,379,057 A | 1/1995 | Clough et al. | |
| 5,404,152 A | 4/1995 | Nagai | |
| 5,408,621 A | 4/1995 | Ben-Arie | |
| 5,414,445 A | 5/1995 | Kaneko et al. | |
| 5,416,498 A | 5/1995 | Grant | |
| 5,424,756 A | 6/1995 | Ho et al. | |
| 5,432,531 A | 7/1995 | Calder et al. | |
| 5,438,331 A | 8/1995 | Gilligan et al. | |
| D362,431 S | 9/1995 | Kaneko et al. | |
| 5,450,075 A | 9/1995 | Waddington | |
| 5,453,761 A | 9/1995 | Tanaka | |
| 5,463,388 A * | 10/1995 | Boie et al. | 341/33 |
| 5,473,343 A | 12/1995 | Kimmich et al. | |
| 5,473,344 A | 12/1995 | Bacon et al. | |
| 5,479,191 A * | 12/1995 | Komatsu | 345/161 |
| 5,479,192 A | 12/1995 | Carroll, Jr. et al. | |
| 5,494,157 A | 2/1996 | Golenz et al. | |
| 5,495,566 A | 2/1996 | Kwatinetz | |
| 5,508,703 A | 4/1996 | Okamura et al. | |
| 5,508,717 A | 4/1996 | Miller | |
| 5,543,588 A | 8/1996 | Bisset et al. | |
| 5,543,591 A | 8/1996 | Gillespie et al. | |
| 5,555,004 A | 9/1996 | Ono et al. | |
| 5,559,301 A | 9/1996 | Bryan, Jr. et al. | |
| 5,559,943 A | 9/1996 | Cyr et al. | |
| 5,561,445 A | 10/1996 | Miwa et al. | |
| 5,564,112 A | 10/1996 | Hayes et al. | |
| 5,565,887 A | 10/1996 | McCambridge et al. | |
| 5,578,817 A | 11/1996 | Bidiville et al. | |
| 5,581,670 A | 12/1996 | Bier et al. | |
| 5,585,823 A | 12/1996 | Duchon et al. | |
| 5,589,856 A | 12/1996 | Stein et al. | |
| 5,589,893 A | 12/1996 | Gaughan et al. | |
| 5,596,347 A | 1/1997 | Robertson et al. | |
| 5,596,697 A | 1/1997 | Foster et al. | |
| 5,598,183 A | 1/1997 | Robertson et al. | |
| 5,611,040 A | 3/1997 | Brewer et al. | |
| 5,611,060 A | 3/1997 | Belfiore et al. | |
| 5,613,137 A | 3/1997 | Bertram et al. | |
| 5,617,114 A | 4/1997 | Bier et al. | |
| 5,627,531 A | 5/1997 | Posso et al. | |
| 5,632,679 A | 5/1997 | Tremmel | |
| 5,640,258 A | 6/1997 | Kurashima et al. | |
| 5,648,642 A | 7/1997 | Miller et al. | |
| D382,550 S | 8/1997 | Kaneko et al. | |
| 5,657,012 A | 8/1997 | Tait | |
| 5,661,632 A | 8/1997 | Register | |
| D385,542 S | 10/1997 | Kaneko et al. | |
| 5,675,362 A | 10/1997 | Clough et al. | |
| 5,689,285 A | 11/1997 | Asher | |
| 5,721,849 A | 2/1998 | Amro | |
| 5,726,687 A | 3/1998 | Belfiore et al. | |
| 5,729,219 A | 3/1998 | Armstrong et al. | |
| 5,730,165 A | 3/1998 | Philipp | |
| 5,748,185 A | 5/1998 | Stephan et al. | |
| 5,751,274 A | 5/1998 | Davis | |
| 5,754,890 A | 5/1998 | Holmdahl et al. | |
| 5,764,066 A | 6/1998 | Novak et al. | |
| 5,777,605 A | 7/1998 | Yoshinobu et al. | |
| 5,786,818 A | 7/1998 | Brewer et al. | |
| 5,790,769 A | 8/1998 | Buxton et al. | |
| 5,798,752 A | 8/1998 | Buxton et al. | |
| 5,805,144 A | 9/1998 | Scholder et al. | |
| 5,808,602 A | 9/1998 | Sellers | |
| 5,812,239 A | 9/1998 | Eger | |
| 5,812,498 A | 9/1998 | Terés | |
| 5,815,141 A | 9/1998 | Phares | |
| 5,825,351 A | 10/1998 | Tam | |
| 5,825,352 A | 10/1998 | Bisset et al. | |
| 5,825,353 A | 10/1998 | Will | |
| 5,828,364 A | 10/1998 | Siddiqui | |
| 5,838,304 A | 11/1998 | Hall | |
| 5,841,078 A | 11/1998 | Miller et al. | |
| 5,841,423 A | 11/1998 | Carroll, Jr. et al. | |
| D402,281 S | 12/1998 | Ledbetter et al. | |
| 5,850,213 A | 12/1998 | Imai et al. | |
| 5,856,645 A | 1/1999 | Norton | |
| 5,856,822 A | 1/1999 | Du et al. | |
| 5,859,629 A | 1/1999 | Tognazzini | |
| 5,861,875 A | 1/1999 | Gerpheide | |
| 5,869,791 A | 2/1999 | Young | |
| 5,875,311 A | 2/1999 | Bertram et al. | |
| 5,883,619 A | 3/1999 | Ho et al. | |
| 5,889,236 A | 3/1999 | Gillespie et al. | |
| 5,889,511 A | 3/1999 | Ong et al. | |
| 5,894,117 A | 4/1999 | Kamishima | |
| 5,903,229 A | 5/1999 | Kishi | |
| 5,907,152 A | 5/1999 | Dandliker et al. | |
| 5,907,318 A | 5/1999 | Medina | |
| 5,909,211 A | 6/1999 | Combs et al. | |

(56) References Cited

U.S. PATENT DOCUMENTS

| | | |
|---|---|---|
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser et al. |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 | 10/2001 | Lincke et al. |
| 6,307,539 B2 | 10/2001 | Suzuki |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| D452,250 S | 12/2001 | Chan |
| 6,337,678 B1 | 1/2002 | Fish |
| 6,340,800 B1 | 1/2002 | Zhai et al. |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,465,271 B1 | 10/2002 | Ko et al. |
| 6,473,069 B1 | 10/2002 | Gerpheide |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Jobs et al. |
| D472,245 S | 3/2003 | Andre et al. |
| 6,546,231 B1 | 4/2003 | Someya et al. |
| 6,563,487 B2 | 5/2003 | Martin et al. |
| 6,587,091 B2 | 7/2003 | Serpa |
| 6,606,244 B1 | 8/2003 | Liu et al. |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,658,773 B2 | 12/2003 | Rohne et al. |
| 6,664,951 B1 | 12/2003 | Fujii et al. |
| 6,677,927 B1 | 1/2004 | Bruck et al. |
| 6,678,891 B1 | 1/2004 | Wilcox et al. |
| 6,686,904 B1 | 2/2004 | Sherman et al. |
| 6,686,906 B2 | 2/2004 | Salminen et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,750,803 B2 | 6/2004 | Yates et al. |
| 6,750,852 B2 * | 6/2004 | Gillespie et al. ............... 345/173 |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,822,640 B2 | 11/2004 | Derocher |
| 6,834,975 B2 | 12/2004 | Chu-Chia et al. |
| 6,844,872 B1 | 1/2005 | Farag et al. |
| 6,855,899 B2 | 2/2005 | Sotome |
| 6,865,718 B2 | 3/2005 | Levi Montalcini |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,958,614 B2 | 10/2005 | Morimoto |
| 6,977,808 B2 | 12/2005 | Lam et al. |
| 6,978,127 B1 | 12/2005 | Bulthuis et al. |
| 6,985,137 B2 | 1/2006 | Kaikuranta |
| 7,006,077 B1 | 2/2006 | Uusimäki |
| 7,019,225 B2 | 3/2006 | Matsumoto et al. |
| 7,046,230 B2 * | 5/2006 | Zadesky et al. ............... 345/173 |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |
| 7,113,196 B2 | 9/2006 | Kerr |
| 7,117,136 B1 | 10/2006 | Rosedale |
| 7,119,792 B1 | 10/2006 | Andre et al. |
| 7,148,704 B2 * | 12/2006 | Philipp ........................ 324/686 |
| 7,215,319 B2 | 5/2007 | Kamijo et al. |
| 7,233,318 B1 | 6/2007 | Farag et al. |
| 7,236,154 B1 | 6/2007 | Kerr et al. |
| 7,236,159 B1 | 6/2007 | Siversson |

(56) References Cited

U.S. PATENT DOCUMENTS

| | | | |
|---|---|---|---|
| 7,253,643 B1* | 8/2007 | Seguine | 324/686 |
| 7,279,647 B2 | 10/2007 | Philipp | |
| 7,288,732 B2 | 10/2007 | Hashida | |
| 7,297,883 B2 | 11/2007 | Rochon et al. | |
| 7,310,089 B2 | 12/2007 | Baker et al. | |
| 7,312,785 B2 | 12/2007 | Tsuk et al. | |
| 7,321,103 B2 | 1/2008 | Nakanishi et al. | |
| 7,333,092 B2 | 2/2008 | Zadesky et al. | |
| 7,345,671 B2* | 3/2008 | Robbin et al. | 345/156 |
| 7,348,898 B2 | 3/2008 | Ono | |
| 7,382,139 B2 | 6/2008 | Mackey | |
| 7,394,038 B2 | 7/2008 | Chang | |
| 7,395,081 B2 | 7/2008 | Bonnelykke Kristensen et al. | |
| 7,397,467 B2 | 7/2008 | Park et al. | |
| 7,439,963 B2 | 10/2008 | Geaghan et al. | |
| 7,466,307 B2 | 12/2008 | Trent et al. | |
| 7,479,949 B2 | 1/2009 | Jobs et al. | |
| 7,486,323 B2 | 2/2009 | Lee et al. | |
| 7,502,016 B2 | 3/2009 | Trent, Jr. et al. | |
| 7,503,193 B2 | 3/2009 | Schoene et al. | |
| 7,593,782 B2 | 9/2009 | Jobs et al. | |
| 7,645,955 B2 | 1/2010 | Huang et al. | |
| 7,656,392 B2* | 2/2010 | Bolender | 345/173 |
| 7,671,837 B2* | 3/2010 | Forsblad et al. | 345/156 |
| 7,688,080 B2 | 3/2010 | Golovchenko et al. | |
| 7,708,051 B2 | 5/2010 | Katsumi et al. | |
| 7,772,507 B2 | 8/2010 | Orr et al. | |
| 7,910,843 B2* | 3/2011 | Rothkopf et al. | 200/5 R |
| 7,973,771 B2 | 7/2011 | Geaghan | |
| 7,982,719 B2* | 7/2011 | Cho et al. | 345/173 |
| 8,068,097 B2* | 11/2011 | GuangHai | 345/173 |
| 8,217,915 B2* | 7/2012 | Philipp | 345/174 |
| 8,441,452 B1* | 5/2013 | Fuller et al. | 345/173 |
| 8,564,546 B1* | 10/2013 | Birch | 345/173 |
| 8,816,986 B1* | 8/2014 | Park et al. | 345/174 |
| 2001/0011991 A1 | 8/2001 | Wang et al. | |
| 2001/0011993 A1 | 8/2001 | Saarinen | |
| 2001/0033270 A1 | 10/2001 | Osawa et al. | |
| 2001/0043545 A1 | 11/2001 | Aratani | |
| 2001/0050673 A1 | 12/2001 | Davenport | |
| 2001/0051046 A1 | 12/2001 | Watanabe et al. | |
| 2002/0000978 A1 | 1/2002 | Gerpheide | |
| 2002/0011993 A1 | 1/2002 | Lui et al. | |
| 2002/0027547 A1 | 3/2002 | Kamijo | |
| 2002/0030665 A1 | 3/2002 | Ano | |
| 2002/0033848 A1 | 3/2002 | Sciammarella et al. | |
| 2002/0039493 A1 | 4/2002 | Tanaka | |
| 2002/0045960 A1 | 4/2002 | Phillips et al. | |
| 2002/0071550 A1 | 6/2002 | Pletikosa | |
| 2002/0089545 A1 | 7/2002 | Levi Montalcini | |
| 2002/0103796 A1 | 8/2002 | Hartley | |
| 2002/0118131 A1 | 8/2002 | Yates et al. | |
| 2002/0118169 A1 | 8/2002 | Hinckley et al. | |
| 2002/0145594 A1 | 10/2002 | Derocher | |
| 2002/0154090 A1 | 10/2002 | Lin | |
| 2002/0158844 A1 | 10/2002 | McLoone et al. | |
| 2002/0164156 A1 | 11/2002 | Bilbrey | |
| 2002/0168947 A1 | 11/2002 | Lemley | |
| 2002/0180701 A1 | 12/2002 | Hayama et al. | |
| 2002/0196239 A1 | 12/2002 | Lee | |
| 2003/0002246 A1 | 1/2003 | Kerr | |
| 2003/0025679 A1 | 2/2003 | Taylor et al. | |
| 2003/0028346 A1 | 2/2003 | Sinclair et al. | |
| 2003/0043121 A1 | 3/2003 | Chen | |
| 2003/0043174 A1 | 3/2003 | Hinckley et al. | |
| 2003/0050092 A1 | 3/2003 | Yun | |
| 2003/0076301 A1 | 4/2003 | Tsuk et al. | |
| 2003/0076303 A1 | 4/2003 | Huppi | |
| 2003/0076306 A1 | 4/2003 | Zadesky et al. | |
| 2003/0091377 A1 | 5/2003 | Hsu et al. | |
| 2003/0095095 A1 | 5/2003 | Pihlaja | |
| 2003/0095096 A1 | 5/2003 | Robbin et al. | |
| 2003/0098851 A1 | 5/2003 | Brink | |
| 2003/0103043 A1 | 6/2003 | Mulligan et al. | |
| 2003/0122792 A1 | 7/2003 | Yamamoto et al. | |
| 2003/0135292 A1 | 7/2003 | Husgafvel et al. | |
| 2003/0142081 A1 | 7/2003 | Iizuka et al. | |
| 2003/0184517 A1 | 10/2003 | Senzui et al. | |
| 2003/0197740 A1 | 10/2003 | Reponen | |
| 2003/0206202 A1 | 11/2003 | Moriya | |
| 2003/0210537 A1 | 11/2003 | Engelmann | |
| 2003/0224831 A1 | 12/2003 | Engstrom et al. | |
| 2004/0027341 A1 | 2/2004 | Derocher | |
| 2004/0074756 A1 | 4/2004 | Kawakami et al. | |
| 2004/0080682 A1 | 4/2004 | Dalton | |
| 2004/0109357 A1 | 6/2004 | Cernea et al. | |
| 2004/0150619 A1 | 8/2004 | Baudisch et al. | |
| 2004/0156192 A1 | 8/2004 | Kerr et al. | |
| 2004/0178997 A1 | 9/2004 | Gillespie et al. | |
| 2004/0200699 A1 | 10/2004 | Matsumoto et al. | |
| 2004/0215986 A1 | 10/2004 | Shakkarwar | |
| 2004/0224638 A1 | 11/2004 | Fadell et al. | |
| 2004/0239622 A1 | 12/2004 | Proctor et al. | |
| 2004/0252109 A1 | 12/2004 | Trent, Jr. et al. | |
| 2004/0252867 A1 | 12/2004 | Lan et al. | |
| 2004/0253989 A1 | 12/2004 | Tupler et al. | |
| 2004/0263388 A1 | 12/2004 | Krumm et al. | |
| 2004/0267874 A1 | 12/2004 | Westberg et al. | |
| 2005/0012644 A1 | 1/2005 | Hurst et al. | |
| 2005/0017957 A1 | 1/2005 | Yi | |
| 2005/0024341 A1 | 2/2005 | Gillespie et al. | |
| 2005/0030048 A1 | 2/2005 | Bolender | |
| 2005/0052425 A1 | 3/2005 | Zadesky et al. | |
| 2005/0052426 A1 | 3/2005 | Hagermoser et al. | |
| 2005/0052429 A1 | 3/2005 | Philipp | |
| 2005/0068304 A1 | 3/2005 | Lewis et al. | |
| 2005/0083299 A1 | 4/2005 | Nagasaka | |
| 2005/0083307 A1 | 4/2005 | Aufderheide | |
| 2005/0090288 A1 | 4/2005 | Stohr et al. | |
| 2005/0104867 A1 | 5/2005 | Westerman et al. | |
| 2005/0110768 A1 | 5/2005 | Marriott et al. | |
| 2005/0129199 A1 | 6/2005 | Abe | |
| 2005/0139460 A1 | 6/2005 | Hosaka | |
| 2005/0140657 A1 | 6/2005 | Park et al. | |
| 2005/0143124 A1 | 6/2005 | Kennedy et al. | |
| 2005/0156881 A1 | 7/2005 | Trent et al. | |
| 2005/0162402 A1 | 7/2005 | Watanachote | |
| 2005/0204309 A1 | 9/2005 | Szeto | |
| 2005/0237308 A1 | 10/2005 | Autio et al. | |
| 2005/0240879 A1 | 10/2005 | Law et al. | |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0032680 A1 | 2/2006 | Elias et al. | |
| 2006/0038791 A1 | 2/2006 | Mackey | |
| 2006/0066582 A1 | 3/2006 | Lyon et al. | |
| 2006/0066588 A1 | 3/2006 | Lyon et al. | |
| 2006/0095848 A1 | 5/2006 | Naik | |
| 2006/0097991 A1 | 5/2006 | Hotelling et al. | |
| 2006/0131156 A1 | 6/2006 | Voelckers | |
| 2006/0143574 A1 | 6/2006 | Ito et al. | |
| 2006/0174568 A1 | 8/2006 | Kinoshita et al. | |
| 2006/0181517 A1 | 8/2006 | Zadesky et al. | |
| 2006/0197750 A1 | 9/2006 | Kerr et al. | |
| 2006/0232557 A1 | 10/2006 | Fallot-Burghardt | |
| 2006/0236262 A1 | 10/2006 | Bathiche et al. | |
| 2006/0250377 A1 | 11/2006 | Zadesky et al. | |
| 2006/0274042 A1 | 12/2006 | Krah et al. | |
| 2006/0274905 A1 | 12/2006 | Lindahl et al. | |
| 2006/0279896 A1 | 12/2006 | Bruwer | |
| 2006/0284836 A1 | 12/2006 | Philipp | |
| 2007/0013671 A1 | 1/2007 | Zadesky et al. | |
| 2007/0018970 A1 | 1/2007 | Tabasso et al. | |
| 2007/0052044 A1 | 3/2007 | Forsblad et al. | |
| 2007/0052691 A1 | 3/2007 | Zadesky et al. | |
| 2007/0080936 A1 | 4/2007 | Tsuk et al. | |
| 2007/0080938 A1 | 4/2007 | Robbin et al. | |
| 2007/0080952 A1 | 4/2007 | Lynch et al. | |
| 2007/0083822 A1 | 4/2007 | Robbin et al. | |
| 2007/0085841 A1 | 4/2007 | Tsuk et al. | |
| 2007/0097086 A1 | 5/2007 | Battles et al. | |
| 2007/0120834 A1 | 5/2007 | Boillot | |
| 2007/0126696 A1 | 6/2007 | Boillot | |
| 2007/0152975 A1 | 7/2007 | Ogihara | |

(56) References Cited

U.S. PATENT DOCUMENTS

| | | |
|---|---|---|
| 2007/0152977 A1 | 7/2007 | Ng et al. |
| 2007/0152983 A1 | 7/2007 | McKillop et al. |
| 2007/0155434 A1 | 7/2007 | Jobs et al. |
| 2007/0157089 A1 | 7/2007 | Van Os et al. |
| 2007/0242057 A1 | 10/2007 | Zadesky et al. |
| 2007/0247421 A1 | 10/2007 | Orsley et al. |
| 2007/0247443 A1 | 10/2007 | Philipp |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285404 A1 | 12/2007 | Rimon et al. |
| 2007/0290990 A1 | 12/2007 | Robbin et al. |
| 2007/0291016 A1* | 12/2007 | Philipp ........................ 345/174 |
| 2007/0296709 A1 | 12/2007 | GuangHai |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0069412 A1 | 3/2008 | Champagne et al. |
| 2008/0079699 A1 | 4/2008 | Mackey |
| 2008/0087476 A1 | 4/2008 | Prest |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0110739 A1 | 5/2008 | Peng et al. |
| 2008/0111795 A1 | 5/2008 | Bollinger |
| 2008/0143681 A1 | 6/2008 | XiaoPing |
| 2008/0158145 A1 | 7/2008 | Westerman |
| 2008/0165141 A1 | 7/2008 | Christie |
| 2008/0165158 A1 | 7/2008 | Hotelling et al. |
| 2008/0196945 A1 | 8/2008 | Konstas |
| 2008/0202824 A1 | 8/2008 | Philipp et al. |
| 2008/0209442 A1 | 8/2008 | Setlur et al. |
| 2008/0264767 A1 | 10/2008 | Chen et al. |
| 2008/0280651 A1 | 11/2008 | Duarte |
| 2008/0284742 A1 | 11/2008 | Prest |
| 2008/0293274 A1 | 11/2008 | Milan |
| 2009/0021267 A1 | 1/2009 | Golovchenko et al. |
| 2009/0026558 A1 | 1/2009 | Bauer et al. |
| 2009/0033635 A1 | 2/2009 | Wai |
| 2009/0036176 A1 | 2/2009 | Ure |
| 2009/0058687 A1 | 3/2009 | Rothkopf et al. |
| 2009/0058801 A1 | 3/2009 | Bull |
| 2009/0058802 A1 | 3/2009 | Orsley et al. |
| 2009/0073130 A1 | 3/2009 | Weber et al. |
| 2009/0078551 A1 | 3/2009 | Kang |
| 2009/0109181 A1 | 4/2009 | Hui et al. |
| 2009/0141046 A1 | 6/2009 | Rathnam et al. |
| 2009/0160771 A1 | 6/2009 | Hinckley et al. |
| 2009/0179854 A1 | 7/2009 | Weber et al. |
| 2009/0197059 A1 | 8/2009 | Weber et al. |
| 2009/0229892 A1 | 9/2009 | Fisher et al. |
| 2009/0273573 A1 | 11/2009 | Hotelling |
| 2009/0322699 A1 | 12/2009 | Hansson |
| 2010/0058251 A1 | 3/2010 | Rottler et al. |
| 2010/0060568 A1 | 3/2010 | Fisher et al. |
| 2010/0073319 A1 | 3/2010 | Lyon et al. |
| 2010/0149127 A1 | 6/2010 | Fisher et al. |
| 2010/0313409 A1 | 12/2010 | Weber et al. |
| 2011/0005845 A1 | 1/2011 | Hotelling et al. |

FOREIGN PATENT DOCUMENTS

| | | |
|---|---|---|
| CN | 1499356 | 5/2004 |
| CN | 1659506 | 8/2005 |
| DE | 3615742 | 11/1987 |
| DE | 19722636 | 12/1998 |
| DE | 10022537 | 11/2000 |
| DE | 20019074 U1 | 2/2001 |
| DE | 10 2004 043 663 | 4/2006 |
| EP | 0178157 | 4/1986 |
| EP | 0419145 A1 | 3/1991 |
| EP | 0 498 540 | 8/1992 |
| EP | 0 521 683 | 1/1993 |
| EP | 0 674 288 | 9/1995 |
| EP | 0 731 407 | 9/1996 |
| EP | 0 551 778 B1 | 1/1997 |
| EP | 0 880 091 A2 | 11/1998 |
| EP | 1 026 713 | 8/2000 |
| EP | 1 081 922 A2 | 3/2001 |
| EP | 1 098 241 A2 | 5/2001 |
| EP | 1 133 057 | 9/2001 |
| EP | 1 162 826 A2 | 12/2001 |
| EP | 1 168 396 | 1/2002 |
| EP | 1 205 836 A2 | 5/2002 |
| EP | 1 244 053 | 9/2002 |
| EP | 1 251 455 A2 | 10/2002 |
| EP | 1263193 | 12/2002 |
| EP | 1347481 | 9/2003 |
| EP | 1376326 | 1/2004 |
| EP | 1 467 392 | 10/2004 |
| EP | 1 482 401 | 12/2004 |
| EP | 1 496 467 | 1/2005 |
| EP | 1 517 228 | 3/2005 |
| EP | 1 542 437 A2 | 6/2005 |
| EP | 1 589 407 | 10/2005 |
| EP | 1 784 058 A2 | 5/2007 |
| EP | 1 841 188 | 10/2007 |
| EP | 1850218 | 10/2007 |
| EP | 1 876 711 | 1/2008 |
| FR | 2 686 440 | 7/1993 |
| GB | 2015167 | 9/1979 |
| GB | 2072389 | 9/1981 |
| GB | 2315186 | 1/1998 |
| GB | 2333215 | 7/1999 |
| GB | 2391060 | 1/2004 |
| GB | 2 402 105 | 12/2004 |
| JP | 57-95722 | 6/1982 |
| JP | 57-97626 | 6/1982 |
| JP | 61-117619 | 6/1986 |
| JP | 61-124009 | 6/1986 |
| JP | 63-20411 | 1/1988 |
| JP | 63-106826 | 5/1988 |
| JP | 63-181022 | 7/1988 |
| JP | 63-298518 | 12/1988 |
| JP | 03-57617 | 6/1991 |
| JP | 3-192418 | 8/1991 |
| JP | 04-32920 | 2/1992 |
| JP | 4-205408 | 7/1992 |
| JP | 5-041135 | 2/1993 |
| JP | 5-080938 | 4/1993 |
| JP | 5-101741 | 4/1993 |
| JP | 5-36623 | 5/1993 |
| JP | 5-189110 | 7/1993 |
| JP | 5-205565 | 8/1993 |
| JP | 5-211021 | 8/1993 |
| JP | 5-217464 | 8/1993 |
| JP | 5-233141 | 9/1993 |
| JP | 5-262276 | 10/1993 |
| JP | 5-265656 | 10/1993 |
| JP | 5-274956 | 10/1993 |
| JP | 5-289811 | 11/1993 |
| JP | 5-298955 | 11/1993 |
| JP | 5-325723 | 12/1993 |
| JP | 6-20570 | 1/1994 |
| JP | 6-084428 | 3/1994 |
| JP | 6-089636 | 3/1994 |
| JP | 6-96639 | 4/1994 |
| JP | 6-111695 | 4/1994 |
| JP | 6-139879 | 5/1994 |

(56) References Cited

FOREIGN PATENT DOCUMENTS

| | | |
|---|---|---|
| JP | 6-187078 | 7/1994 |
| JP | 6-208433 | 7/1994 |
| JP | 6-267382 | 9/1994 |
| JP | 6-283993 | 10/1994 |
| JP | 6-333459 | 12/1994 |
| JP | 7-107574 | 4/1995 |
| JP | 7-41882 | 7/1995 |
| JP | 7-201249 | 8/1995 |
| JP | 7-201256 | 8/1995 |
| JP | 7-253838 | 10/1995 |
| JP | 7-261899 | 10/1995 |
| JP | 7-261922 | 10/1995 |
| JP | 7-296670 | 11/1995 |
| JP | 7-319001 | 12/1995 |
| JP | 8-016292 | 1/1996 |
| JP | 8-115158 | 5/1996 |
| JP | 8-203387 | 8/1996 |
| JP | 8-293226 | 11/1996 |
| JP | 8-298045 | 11/1996 |
| JP | 8-299541 | 11/1996 |
| JP | 8-316664 | 11/1996 |
| JP | 9-044289 | 2/1997 |
| JP | 9-069023 | 3/1997 |
| JP | 9-128148 | 5/1997 |
| JP | 9-134248 | 5/1997 |
| JP | 9-218747 | 8/1997 |
| JP | 9-230993 | 9/1997 |
| JP | 9-231858 | 9/1997 |
| JP | 9-233161 | 9/1997 |
| JP | 9-251347 | 9/1997 |
| JP | 9-258895 | 10/1997 |
| JP | 9-288926 | 11/1997 |
| JP | 9-512979 | 12/1997 |
| JP | 10-63467 | 3/1998 |
| JP | 10-74127 | 3/1998 |
| JP | 10-074429 | 3/1998 |
| JP | 10-198507 | 7/1998 |
| JP | 10-227878 | 8/1998 |
| JP | 10-240693 | 9/1998 |
| JP | 10-320322 | 12/1998 |
| JP | 10-326149 | 12/1998 |
| JP | 11-24834 | 1/1999 |
| JP | 11-184607 | 7/1999 |
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 11-272378 | 10/1999 |
| JP | 11-338628 | 12/1999 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3085481 | 2/2002 |
| JP | 2002-215311 | 8/2002 |
| JP | 2003-015796 | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-0008579 | 2/2000 |
| KR | 2001-0052016 | 6/2001 |
| KR | 2001-108361 | 12/2001 |
| KR | 2002-65059 | 8/2002 |
| KR | 10-2006-0021678 | 3/2006 |
| TW | 431607 | 4/2001 |
| TW | 00470193 | 12/2001 |
| TW | 547716 | 8/2003 |
| TW | I220491 | 8/2004 |
| WO | WO-94/17494 | 8/1994 |
| WO | WO-95/00897 A1 | 1/1995 |
| WO | WO-96/27968 | 9/1996 |
| WO | WO 98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/044645 | 5/2003 |
| WO | WO-03/044956 | 5/2003 |
| WO | WO-03/025960 | 9/2003 |
| WO | WO-03/088176 | 10/2003 |
| WO | WO-03/090008 | 10/2003 |
| WO | WO-2004/001573 | 12/2003 |
| WO | WO-2004/040606 | 5/2004 |
| WO | WO-2004/091956 | 10/2004 |
| WO | WO-2005/055620 | 6/2005 |
| WO | WO-2005/076117 | 8/2005 |
| WO | WO-2005/114369 | 12/2005 |
| WO | WO-2005/124526 | 12/2005 |
| WO | WO-2006/020305 | 2/2006 |
| WO | WO-2006/021211 A2 | 3/2006 |
| WO | WO-2006/037545 | 4/2006 |
| WO | WO 2006/104745 | 10/2006 |
| WO | WO-2006/135127 | 12/2006 |
| WO | WO-2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

Bull, U.S. Office Action mailed Feb. 4, 2011, directed to U.S. Appl. No. 11/849,801; 22 pages.

Weber et al, U.S. Office Action mailed Jan. 7, 2011, directed to U.S. Appl. No. 11/856,530; 13 pages.

Weber et al., U.S. Office Action mailed Jan. 7, 2011, directed to U.S. Appl. No. 12/205,795; 21 pages.

Weber et al., U.S. Office Action mailed Feb. 17, 2011, directed to U.S. Appl. No. 12/844,502; 11 pages.

Ng et al., U.S. Office Action mailed Jul. 8, 2010, directed to U.S. Appl. No. 11/882,423; 19 pages.

Ng et al., U.S. Office Action mailed Dec. 9, 2010, directed to U.S. Appl. No. 11/394,493; 13 pages.

Zadesky et al., U.S. Office Action mailed Nov. 16, 2010, directed to U.S. Appl. No. 11/477,469; 13 pages.

Lampell, U.S. Office Action mailed Dec. 3, 2010, directed to U.S. Appl. No. 11/530,807; 17 pages.

Lampell et al., U.S. Office Action mailed Dec. 22, 2010, directed to U.S. Appl. No. 11/882,427; 16 pages.

Hotelling, U.S. Office Action mailed Dec. 8, 2010, directed to U.S. Appl. No. 11/482,286; 33 pages.

Elias et al., U.S. Office Action mailed Nov. 22, 2010, directed to U.S. Appl. No. 11/203,692; 6 pages.

Lynch et al., U.S. Office Action mailed Oct. 5, 2009, directed to U.S. Appl. No. 11/499,360; 7 pages.

Lynch et al., U.S. Office Action mailed Jan. 27, 2010, directed to U.S. Appl. No. 11/499,360; 8 pages.

(56) References Cited

OTHER PUBLICATIONS

Ng et al., U.S. Office Action mailed Jan. 14, 2010, directed to U.S. Appl. No. 11/394,493; 20 pages.
Ng et al., U.S. Office Action mailed Jan. 15, 2010, directed to U.S. Appl. No. 11/882,423; 22 pages.
Tsuk et al., U.S. Office Action mailed Dec. 31, 2009, directed to U.S. Appl. No. 11/610,190; 25 pages.
Zadesky et al., U.S. Office Action mailed Feb. 4, 2010, directed to U.S. Appl. No. 11/477,469; 14 pages.
Hotelling, U.S. Office Action mailed Jan. 25, 2010, directed to U.S. Appl. No. 11/482,286; 17 pages.
Interlink Electronics, VersaPad: Integration Guide, © 1998 (VersaPad), pp. 1-35.
Letter re: Bang & Olufsen a/s by David Safran, Nixon Peabody, LLP, May 21, 2004, with BeoCom 6000 Sales Training Brochure, 7 pages.
Kobayashi et al. (1994) "Development of the Touch Switches with the Click Response," Koukuu Denshi Gihou No. 17, pp. 44-48 (published by the Japan Aviation Electronics Industry, Ltd.).
Photographs of Innovation 2000 Best of Show Award Presented at the 2000 Int'l CES Innovations Design & Engineering Showcase, Jan. 6, 2000, 1 page.
SanDisk Sansa Connect User Guide, 2007; 29 pages.
Tsuk et al., U.S. Office Action mailed Apr. 19, 2011, directed to U.S. Appl. No. 11/610,190; 25 pages.
Tsuk et al., U.S. Office Action mailed Mar. 31, 2011, directed to U.S. Appl. No. 11/959,918; 9 pages.
Robbin et al., U.S. Office Action mailed Apr. 26, 2011, directed to U.S. Appl. No. 11/838,845; 9 pages.
Zadesky et al., U.S. Office Action mailed Mar. 31, 2011, directed to U.S. Appl. No. 11/882,005; 7 pages.
Bollinger et al., U.S. Office Action mailed Mar. 21, 2011, directed to U.S. Appl. No. 11/842,724; 22 pages.
McKillop et al., U.S. Office Action mailed Mar. 24, 2011, directed to U.S. Appl. No. 11/591,752; 11 pages.
Zadesky et al., U.S. Office Action mailed Mar. 16, 2011, directed to U.S. Appl. No. 11/882,003; 12 pages.
Rathnam et al., U.S. Office Action mailed Mar. 24, 2011, directed to U.S. Appl. No. 12/205,757; 14 pages.
Tsuk et al., U.S. Office Action mailed Apr. 28, 2010, directed to U.S. Appl. No. 11/610,190; 29 pages.
Zadesky et al., U.S. Office Action mailed Mar. 30, 2010, directed to U.S. Appl. No. 11/592,679; 13 pages.
Hotelling et al., U.S. Office Action mailed Mar. 30, 2010, directed to U.S. Appl. No. 11/483,008; 20 pages.
Elias et al., U.S. Office Action mailed Mar. 30, 2010, directed to U.S. Appl. No. 11/203,692; 15 pages.
Tsuk et al., U.S. Office Action mailed Aug. 6, 2010, directed to U.S. Appl. No. 11/610,190; 30 pages.
Zadesky et al., U.S. Office Action mailed Aug. 2, 2010, directed to U.S. Appl. No. 11/882,004; 9 pages.
Marriott et al., U.S. Office Action mailed Aug. 19, 2010, directed to U.S. Appl. No. 11/882,422; 13 pages.
Hotelling, U.S. Office Action mailed Aug. 18, 2010, directed to U.S. Appl. No. 11/882,424; 16 pages.
Bull, U.S. Office Action mailed Jul. 9, 2010, directed to U.S. Appl. No. 11/849,801; 13 pages.
Tsuk et al., U.S. Office Action mailed Nov. 1, 2010, directed to U.S. Appl. No. 11/959,918; 9 pages.
Tsuk et al., U.S. Office Action mailed Oct. 26, 2010, directed to U.S. Appl. No. 11/959,942; 27 pages.
Robbin et al., U.S. Office Action mailed Oct. 29, 2010, directed to U.S. Appl. No. 11/838,845; 8 pages.
Ng et al., U.S. Office Action mailed Oct. 26, 2010, directed to U.S. Appl. No. 11/882,423; 18 pages.
Zadesky et al., U.S. Office Action mailed Oct. 4, 2010, directed to U.S. Appl. No. 11/057,050; 31 pages.
McKillop et al., U.S. Office Action mailed Sep. 16, 2010, directed to U.S. Appl. No. 11/591,752; 14 pages.
Zadesky et al., U.S. Office Action mailed Sep. 29, 2010, directed to U.S. Appl. No. 11/882,003; 13 pages.
Hotelling, U.S. Office Action mailed Oct. 1, 2010, directed to U.S. Appl. No. 11/482,286; 28 pages.
Hotelling et al., U.S. Office Action mailed Oct. 27, 2010, directed to U.S. Appl. No. 11/483,008; 23 pages.
Weber et al., U.S. Office Action mailed Oct. 13, 2010, directed to U.S. Appl. No. 12/205,795; 15 pages.
Ng et al., U.S. Office Action mailed Jun. 22, 2010, directed to U.S. Appl. No. 11/394,493; 14 pages.
Lampell, U.S. Office Action mailed Jun. 4, 2010, directed to U.S. Appl. No. 11/530,807; 15 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Bollinger et al., U.S. Office Action mailed Jun. 25, 2010, directed to U.S. Appl. No. 11/842,724; 22 pages.
Hotelling, U.S. Office mailed Jun. 9, 2010, directed to U.S. Appl. No. 11/482,286; 21 pages.
Elias et al., U.S. Office Action mailed Jun. 11, 2010, directed to U.S. Appl. No. 11/203,692; 17 pages.
Weber et al., U.S. Office Action mailed Jun. 7, 2010, directed to U.S. Appl. No. 11/856,530; 15 pages.
"About Quicktip®" www.logicad3d.com/docs/qt.html, downloaded Apr. 8, 2002.
"Alps Electric introduces the GlidePoint Wave Keyboard; combines a gently curved design with Alps' advanced GlidePoint Technology," Business Wire (Oct. 21, 1996).
"Alps Electric Ships GlidePoint Keyboard for the Macintosh; Includes a GlidePoint Touchpad, Erase-Eaze Backspace Key and Contoured Wrist Rest," Business Wire (Jul. 1, 1996).
"Apple Presents iPod: Ultra-Portable MP3 Music Player Puts 1,000 Songs in Your Pocket," retreived from http://www.apple.com/pr/library/2001/oct/23ipod.html on Oct. 23, 2001.
"Apple Unveils Optical Mouse and New Pro Keyboard," Press Release, Jul. 19, 2000.
"APS show guide to exhibitors," Physics Today 49(3) (Mar. 1996).
"Atari VCS/2600 Peripherals," www.classicgaming.com/gamingmuseum/2006p.html, downloaded Feb. 28, 2007, pp. 1-15.
"Der Klangmeister," Connect Magazine, Aug. 1998.
"Design News literature plus," Design News 51(24) (Dec. 18, 1995).
"Manufactures," Laser Focus World, Buyers Guide '96, 31(12) (Dec. 1995).
"National Design Engineering Show," Design News 52(5) (Mar. 4, 1996).
"Neuros MP3 Digital Audio Computer," www.neurosaudio.com, downloaded Apr. 9, 2003.
"OEM Touchpad Modules" website www.glidepoint.com/sales/modules.index.shtml, downloaded Feb. 13, 2002.
"Preview of exhibitor booths at the Philadelphia show," Air Conditioning, Heating & News 200(2) (Jan. 13, 1997).
"Product news," Design News 53(11) (Jun. 9, 1997).
"Product news," Design News 53(9) (May 5, 1997).
"Product Overview—ErgoCommander®," www.logicad3d.com/products/ErgoCommander.htm, downloaded Apr. 8, 2002.
"Product Overview—SpaceMouse® Classic," www.logicad3d.com/products/Classic.htm, downloaded Apr. 8, 2002.
"Synaptics Tough Pad Interfacing Guide," Second Edition, Mar. 25, 1998, Synaptics, Inc., San Jose, CA, pp. 1-90.
"System Service and Troubleshooting Manual," www.dsplib.com/intv/Master, downloaded Dec. 11, 2002.
"Triax Custom Controllers due; Video Game Controllers," HFD—The Weekly Home Furnishing Newspaper 67(1) (Jan. 4, 1993).
"Diamond Multimedia Announces Rio PMP300 Portable MP3 Music Player," located at http://news.harmony-central.com/Newp/1998/Rio-PMP300.html visited on May 5, 2008. (4 pages).

(56) References Cited

OTHER PUBLICATIONS

"Touchpad," Notebook PC Manual, ACER Information Co. Ltd., Feb. 16, 2005, pp. 11-12.
Ahl, David, "Controller Update," Creative Computing Vo. 9, No. 12, Dec. 1983.
Ahmad, "A Usable Real-Time 3D Hand Tracker," Proceedings of the 28th Asilomar Conference on Signals, Systems and Computers—Part 2 (of 2) vol. 2 (Oct. 1994).
Baig, E.C., "Your PC Just Might Need a Mouse," U.S. News & World Report 108(22) (Jun. 4, 1990).
Bang & Olufsen Telecom a/s, "BeoCom 6000 User Guide 2000."
Bartimo, Jim, "The Portables: Travelling Quickly," Computerworld (Nov. 14, 1983).
BeoCom 6000, Sales Training Brochure, date unknown.
Boling, Douglas (1993) "Programming Microsoft Windows ce.net," p. 109.
Bollinger, U.S. Appl. No. 60/858,404, filed Nov. 13, 2006, entitled "Method of Capacitively Sensing Finger Position"; 13 pages.
Bray, "Phosphors help switch on xenon," Physics in Action, pp. 1-3, Apr. 1999.
Brink et al., "Pumped-up portables," U.S. News & World Report 116(21) (May 30, 1994).
Brown et al., "Windows on Tablets as a Means of Achieving Virtual Input Devices," Human-Computer Interaction—INTERACT '90 (1990).
Buxton et al., "Issues and Techniques in Touch-Sensitive Tablet Input," Computer Graphics 19(3), Proceedings of SIGGRAPH '85 (1985).
Chapweske, Adam "PS/2 Mouse/Keyboard Protocol," 1999, http://panda.cs.ndsu.nodak.edu/~achapwes/PICmicro/PS2/ps2.htm.
Chen et al., "A Study in Interactive 3-D Rotation Using 2-D Control Devices," Computer Graphics 22(4) (Aug. 1988).
Chinese Office Action issue Dec. 29, 2006, directed to CN Application No. 200510103886.3, 25 pages.
De Meyer, Kevin, "Crystal Optical Mouse," Feb. 14, 2002, Heatseekerz, Web Article 19.
Elias et al., U.S. Office Action mailed Aug. 4, 2009, directed to U.S. Appl. No. 11/203,692; 12 pages.
Elias et al., U.S. Office Action mailed Feb. 23, 2009, directed to U.S. Appl. No. 11/203,692; 13 pages.
Elias et al., U.S. Office Action mailed Sep. 17, 2008, directed to U.S. Appl. No. 11/203,692; 8 pages.
Elias et al., U.S. Appl. No. 60/522,107, filed Aug. 16, 2004, entitled, "A Method for Increasing the Spatial Resolution of Touch Sensitive Devices"; 15 pages.
Evans et al., "Tablet-based Valuators that Provide One, Two, or Three Degrees of Freedom," Computer Grahics 15(3) (Aug. 1981).
EVB Elektronik "TSOP6238 IR Receiver Modules for Infrared Remote Control Systems" dated Jan. 2004 1 page.
Fiore, "Zen Touchpad," Cornell University, May 2000.
Fisher et al., U.S. Appl. No. 61/036,804, filed Mar. 14, 2008 entitled "Switchable Sensor Configurations"; 46 pages.
Forsblad et al., U.S. Office Action mailed Jan. 26, 2009, directed to U.S. Appl. No. 11/355,022; 15 pages.
Forsblad et al., U.S. Office Action mailed Jan. 27, 2009, directed to U.S. Appl. No. 11/882,421; 15 pages.
Forsblad et al., U.S. Office Action mailed Jun. 25, 2009, directed to U.S. Appl. No. 11/355,022; 18 pages.
Gadgetboy, "Point and click with the latest mice," CNET Asia Product Review, www.asia.cnet.com/reviews...are/gadgetboy/0.39001770.380235900.00.htm, downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Grignon et al., U.S. Appl. No. 60/755,656, filed Dec. 30, 2005, entitled "Touch Pad with Feedback"; 109 pages.
Hotelling et al., U.S. Office Action mailed Jul. 24, 2009, directed to U.S. Appl. No. 11/483,008; 17 pages.
Hotelling et al., U.S. Office Action mailed Jul. 27, 2009, directed to U.S. Appl. No. 11/882,420; 17 pages.
Hotelling, U.S. Office Action mailed Sep. 1, 2009, directed to U.S. Appl. No. 11/482,286; 14 pages.
Hotelling, U.S. Appl. No. 60/658,777 titled "Multi-Functional Handheld Device," filed Mar. 4, 2005; 68 pages.
Jesitus, John, "Broken promies?", Industry Week/IW 246(20) (Nov. 3, 1997).
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. "Development of the Touch Switches with the Click Response," Koukuu Denshi Gihou No. 17, pp. 44-48 (1994-3) (published by the Japan Aviation Electronics Industry, Ltd.).
Kobayashi et al. (1997) "Dynamic Soundscape: Mapping Time to Space for Audio Browsing," Computer Human Interaction: 16 pages.
Lampell et al., U.S. Appl. No. 60/810,423, filed Jun. 2, 2006, entitled "Techniques for Interactive Input to Portable Electronic Devices"; 53 pages.
Lampell, U.S. Office Action mailed Sep. 15, 2009, directed to U.S. Appl. No. 11/530,807; 15 pages.
Letter re: Bang & Olufsen a/s by David Safran, Nixon Peabody, LLP May 21, 2004.
Luna Technologies International, Inc., LUNA Photoluminescent Safety Products, "Photoluminescence—What is Photoluminescence?" from website at http://www.lunaplast.com/photoluminescence.com on Dec. 27, 2005.
Marriott et al., U.S. Office Action mailed Dec. 12, 2006, directed to U.S. Appl. No. 10/722,948; 14 pages.
Marriott et al., U.S. Office Action mailed Jan. 30, 2008, directed to U.S. Appl. No. 10/722,948; 17 pages.
Marriott et al., U.S. Office Action mailed Jul. 13, 2007, directed to U.S. Appl. No. 10/722,948; 15 pages.
Marriott et al., U.S. Office Action mailed Jun. 2, 2006, directed to U.S. Appl. No. 10/722,948; 12 pages.
Mims, Forrest M., III, "A Few Quick Pointers; Mouses, Touch Screens, Touch Pads, Light Pads, and The Like Can Make System Easier to Use," Computers & Electronics (22) (May 1984).
Nass, Richard, "Touchpad input device goes digital to give portable systems a desktop 'mouse-like' feel," Electronic Design 44(18) (Sep. 3, 1996).
Perenson, Melissa, "New & Improved: Touchpad Redux," PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors," Electronics Now 64(3) (Mar. 1993).
Photographs of Innovation 2000 Best of Show Award Presented at the 2000 Int'l CES Innovations 2000 Design & Engineering Showcase, 1 page.
Prest et al., U.S. Appl. No. 60/850,662, filed Oct. 11, 2006, entitled, "Capacitive Scroll Wheel"; 21 pages.
Rathnam et al., U.S. Appl. No. 60/992,056, filed Dec. 3, 2007, entitled, "Scroll Wheel Circuit Arrangements and Methods of Use Thereof"; 42 pages.
Rathnam et al., U.S. Appl. No. 61/017,436, filed Dec. 28, 2007, entitled, "Multi-Touch Scroll Wheel Circuit Arrangements and Processing Methods"; 58 pages.
Robbin et al., U.S. Office Action mailed Aug. 10, 2009, directed to U.S. Appl. No. 11/610,376; 11 pages.
Robbin et al., U.S. Office Action mailed Aug. 12, 2009, directed to U.S. Appl. No. 11/610,384; 20 pages).
Robbin et al., U.S. Office Action mailed Aug. 3, 2006, directed to U.S. Appl. No. 10/259,159; 15 pages.
Robbin et al., U.S. Office Action mailed Jan. 11, 2006, directed to U.S. Appl. No. 10/259,159; 15 pages.
Robbin et al., U.S. Office Action mailed Jan. 18, 2007, directed to U.S. Appl. No. 10/259,159; 18 pages.
Robbin et al., U.S. Office Action mailed Jun. 16, 2005, directed to U.S. Appl. No. 10/259,159; 16 pages.
Robbin et al., U.S. Office Action mailed Oct. 13, 2006, directed to U.S. Appl. No. 10/259,159; 18 pages.
Robbin et al., U.S. Office Action mailed Sep. 30, 2004, directed to U.S. Appl. No. 10/259,159; 14 pages.

(56) References Cited

OTHER PUBLICATIONS

Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Robbin, U.S. Appl. No. 60/346,237 entitled, "Method and System for List Scrolling," filed Oct. 22, 2001; 12 pages.
Rothkopf, U.S. Appl. No. 60/935,854 titled "Compact Media Players," filed Sep. 4, 2007; 36 pages.
SanDisk Sansa Connect User Guide; 29 pages.
Soderholm, Lars G., "Sensing Systems for 'Touch and Feel,'" Design News (May 8, 1989): pp. 72-76.
Sony presents "Choice Without Compromise" at IBC '97 M2 PRESSWIRE (Jul. 24, 1997).
Spiwak, Marc, "A Great New Wireless Keyboard," Popular Electronics 14(12) (Dec. 1997).
Spiwak, Marc, "A Pair of Unusual Controllers," Popular Electronics 14(4) (Apr. 1997).
Sylvania, "Intellvision™ Intelligent Television Master Component Service Manual," pp. 1, 2 and 8, 1979.
Tessler, Franklin, "Point Pad," Macworld 12(10) (Oct. 1995).
Tessler, Franklin, "Smart Input: How to Chose from the New Generation of Innovative Input Devices," Macworld 13(5) (May 1996).
Tessler, Franklin, "Touchpads," Macworld 13(2) (Feb. 1996).
Translation of Trekstor's Defense Statement to the District Court Mannheim of May 23, 2008; 37 pages.
Tsuk et al., U.S. Office Action mailed Aug. 3, 2006, directed to U.S. Appl. No. 10/256,716; 15 pages.
Tsuk et al., U.S. Office Action mailed Aug. 7, 2009, directed to U.S. Appl. No. 11/610,181; 20 pages.
Tsuk et al., U.S. Office Action mailed Jan. 10, 2006, directed to U.S. Appl. No. 10/256,716; 12 pages.
Tsuk et al., U.S. Office Action mailed Jul. 7, 2009, directed to U.S. Appl. No. 11/610,190; 24 pages.
Tsuk et al., U.S. Office Action mailed Jun. 24, 2005, directed to U.S. Appl. No. 10/256,716; 12 pages.
Tsuk et al., U.S. Office Action mailed Oct. 13, 2006, directed to U.S. Appl. No. 10/256,716; 16 pages.
Tsuk et al., U.S. Office Action mailed Sep. 30, 2004, directed to U.S. Appl. No. 10/256,716; 11 pages.
Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.
Zadesky et al, U.S. Office Action mailed Aug. 19, 2008, directed to U.S. Appl. No. 11/057,050; 23 pages.
Zadesky et al., U.S. Office Action mailed Aug. 6, 2009, directed to U.S. Appl. No. 11/057,050; 30 pages.
Zadesky et al., U.S. Office Action mailed Dec. 12, 2007, directed to U.S. Appl. No. 10/643,256; 12 pages.
Zadesky et al., U.S. Office Action mailed Dec. 24, 2008, directed to U.S. Appl. No. 11/057,050; 25 pages.
Zadesky et al., U.S. Office Action mailed Feb. 20, 2009, directed to U.S. Appl. No. 11/057,050; 25 pages.
Zadesky et al., U.S. Office Action mailed Jul. 13, 2007, directed to U.S. Appl. No. 10/643,256; 13 pages.
Zadesky et al., U.S. Office Action mailed Jul. 30, 2004, directed to U.S. Appl. No. 10/188,182; 7 pages.
Zadesky et al., U.S. Office Action mailed Jul. 9, 2008, directed to U.S. Appl. No. 10/643,256; 12 pages.
Zadesky et al., U.S. Office Action mailed Mar. 23, 2007, directed to U.S. Appl. No. 10/643,256; 11 pages.
Zadesky et al., U.S. Office Action mailed Mar. 4, 2004, directed to U.S. Appl. No. 10/188,182; 8 pages.
Zadesky et al., U.S. Office Action mailed Mar. 5, 2009, directed to U.S. Appl. No. 11/477,469; 12 pages.
Zadesky et al., U.S. Office Action mailed Nov. 20, 2007, directed to U.S. Appl. No. 11/057,050; 33 pages.
Zadesky et al., U.S. Office Action mailed Nov. 26, 2008, directed to U.S. Appl. No. 11/057,050; 25 pages.
Zadesky et al., U.S. Office Action mailed Oct. 27, 2006, directed to U.S. Appl. No. 10/643,256; 14 pages.
Zadesky et al., U.S. Office Action mailed Oct. 4, 2007, directed to U.S. Appl. No. 11/386,238; 12 pages.
Zadesky et al., U.S. Office Action mailed Sep. 21, 2005, directed to U.S. Appl. No. 10/188,182; 10 pages.
Zadesky et al., U.S. Appl. No. 60/359,551 entitled "Touchpad for Handheld Device," filed Feb. 25, 2002; 34 pages.
Zadesky et al., U.S. Appl. No. 60/714,609 entitled "Scrolling Input Arrangements Using Capacitive Sensors on a Flexible Membrane," filed Sep. 6, 2005; 17 pages.
Zadesky et al.., U.S. Office Action mailed Oct. 4, 2007, directed to U.S. Appl. No. 11/806,957; 14 pages.
Fisher et al., Office Action mailed Jan. 18, 2012, directed to U.S. Appl. No. 12/205,770; 32 pages.
Fisher et al., Office Action dated Oct. 25, 2011, directed to in U.S. Appl. No. 12/205,770; 24 pages.

* cited by examiner

FIG. 7
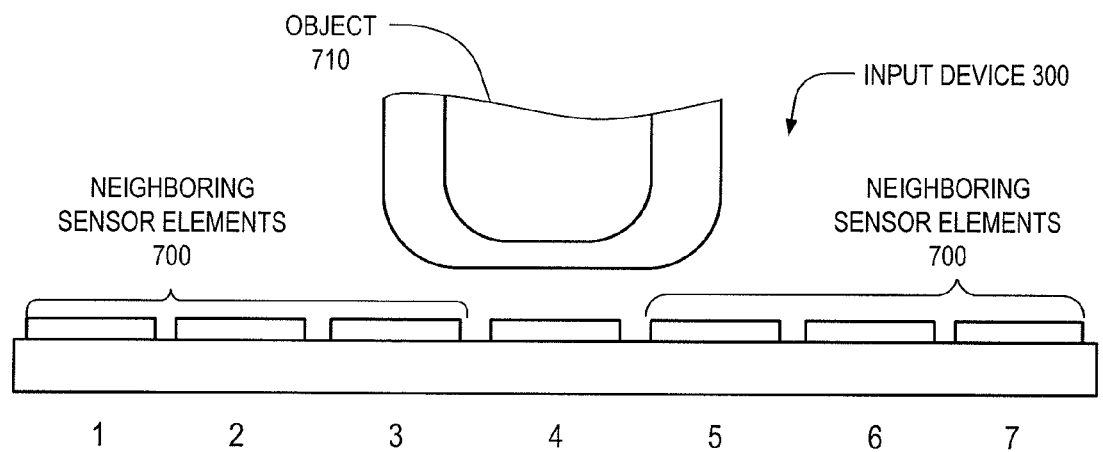
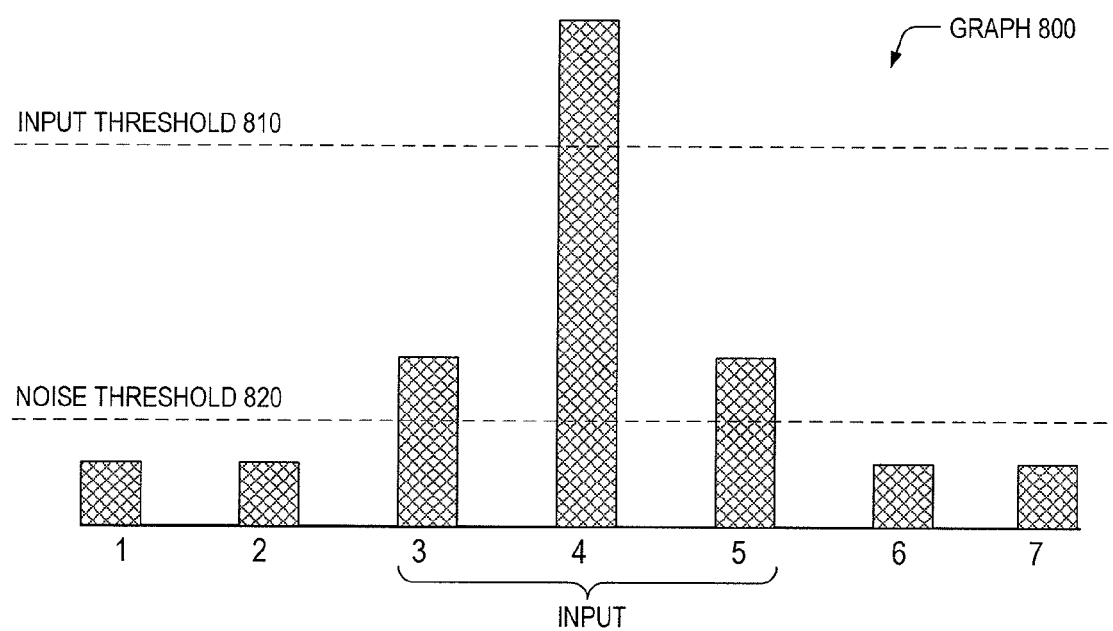
FIG. 8

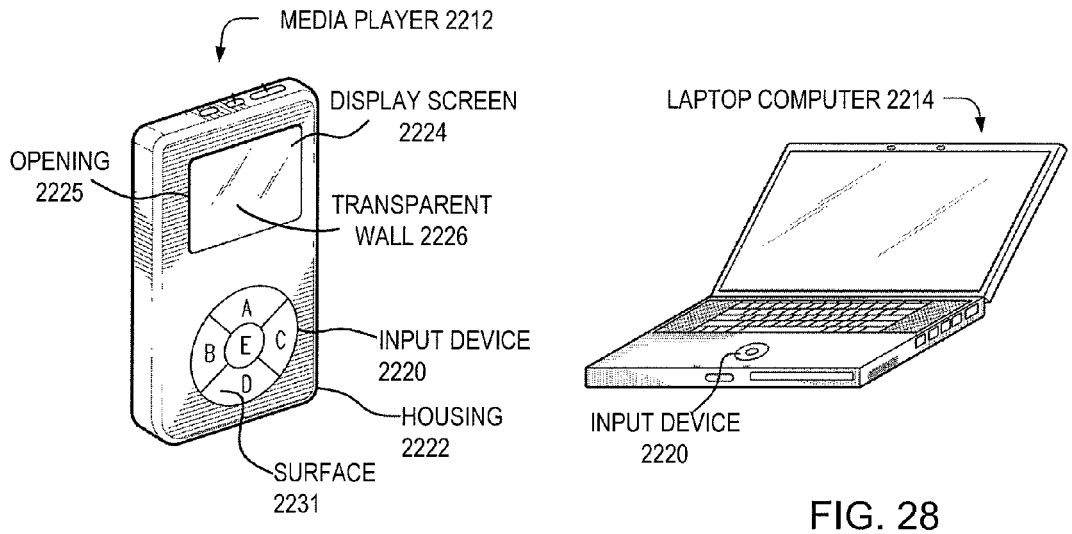
FIG. 27
FIG. 28
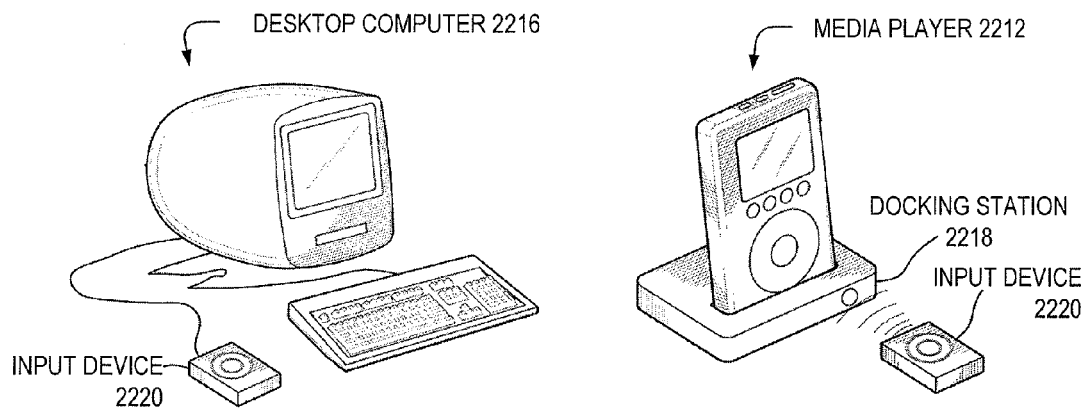
FIG. 29
FIG. 30

INPUT DEVICE WITH OPTIMIZED CAPACITIVE SENSING

CROSS REFERENCE TO RELATED APPLICATION

This claims priority under 35 USC 119(e) to U.S. Provisional Application No. 61/178,936, filed May 15, 2009, the entirety of which is incorporated herein by reference.

FIELD OF THE DISCLOSURE

This relates generally to input detection, and more particularly to improving input detection associated with weak sensor elements.

BACKGROUND

Several varieties of input devices exist for performing operations in portable electronic devices. Some examples of input devices include buttons, switches, keyboards, mice, trackballs, touch pads, joy sticks, touch screens and the like. Some examples of portable electronic devices include media players, remote controls, personal digital assistants (PDAs), cellular phones, etc.

A user can cause an operation to be performed in a portable electronic device by applying an input to an input device. In one example, a user can move a cursor displayed on a display screen of the portable electronic device by touching an input device in a particular motion. In another example, a user can select an item displayed on the display screen by pressing an input device in a particular location.

Input devices that provide touch sensitive surfaces, such as touch panels and touch screens for example, are becoming increasingly popular because of their ease and versatility of operation. With touch sensitive surfaces, various sensor elements can be provided relative to a surface of an electronic device, and an input can be detected by sensing a change in some measure, such as capacitance for example, that is associated with the sensor elements and that exceeds a particular threshold level.

If the threshold level is set too low, the touch sensitive surface can become too sensitive, allowing unintended actions (e.g., setting the touch sensitive surface on a table) or effects (e.g., noise) to be detected as an input. If the threshold level is set too high, the touch sensitive surface can become too insensitive, allowing intended input actions (e.g., a light touching of the surface) to go undetected.

Accordingly, determining a proper threshold level for a touch sensitive device can provide unique challenges.

SUMMARY

An input device is disclosed that can improve input detection associated with sensor elements that exhibit a weaker response at the lower end of their dynamic range than their counterparts in the input device. Improving the response of the weak sensor elements can be advantageous when implementing input reporting rules that rely on a sufficient response at the lower end of a sensor element's dynamic range.

For example, an input reporting rule can specify that an input, such as a touch event on a touch sensitive surface for example, can be reported if at least one sensor element of the input device provides a strong input signal (e.g., a signal level above an input threshold) and at least one adjacent sensor element provides at least a weak input signal (e.g., a signal level above a noise threshold). This type of input reporting rule can prevent the occurrence of a spike (e.g., a strong signal caused by radio frequency interference) on a single sensor element from registering as a false touch event. However, if an adjacent sensor element exhibits a weak response at the lower end of its dynamic range, it may not be able to differentiate a weak input signal (e.g., a signal level above a noise threshold but below the input threshold) from noise (e.g., a signal level below a noise threshold), causing a false negative to occur in response to an actual touch event.

Accordingly, the input device can compensate for a weak sensor element at the low end of its dynamic range by increasing its sensitivity in certain situations. For example, in one embodiment, the input device can increase a weak sensor element's sensitivity when an adjacent sensor provides a strong input signal. In another embodiment, the input device can increase the sensitivity of all sensor elements when any of the sensor elements of the input device provides a strong input signal. In a further embodiment, the input device can apply hysteresis to a weak sensor element, whereby the sensitivity of the weak sensor element can be increased when a signal level of the weak sensor exceeds a noise threshold, and the sensitivity can be restored when a signal level of the weak sensor meets or falls below the noise threshold.

The sensitivity of the weak sensor element can be increased in a variety of ways. In one embodiment, the input device can increase the sensitivity of the sensor element by reducing a noise threshold associated with the sensor element. In another embodiment, the input device can increase the sensitivity of the sensor element by boosting a signal level associated with the sensor element.

In a further embodiment, input detection can be improved by customizing a scale factor associated with distinct sensor elements of the input device in order to normalize the associated sensing operations. In yet another embodiment, the input reporting rule described above can be modified to allow the reporting of a single strong input signal, without an accompanying weak or strong input signal, when an input has been reported in a preceding scan cycle.

BRIEF DESCRIPTION OF THE DRAWINGS

FIGS. 7 and 8 illustrate an example of an input detection by an input device.

FIGS. 27-30 illustrate examples of applications of input devices.

DETAILED DESCRIPTION

The present disclosure describes embodiments of an input device that can improve input detection associated with sensor elements that exhibit a weaker response at the lower end of their dynamic range than their counterparts in the input device. Improving the response of the weak sensor elements can be advantageous when implementing input reporting rules that rely on a sufficient response at the lower end of a sensor element's dynamic range.

Figure 1:
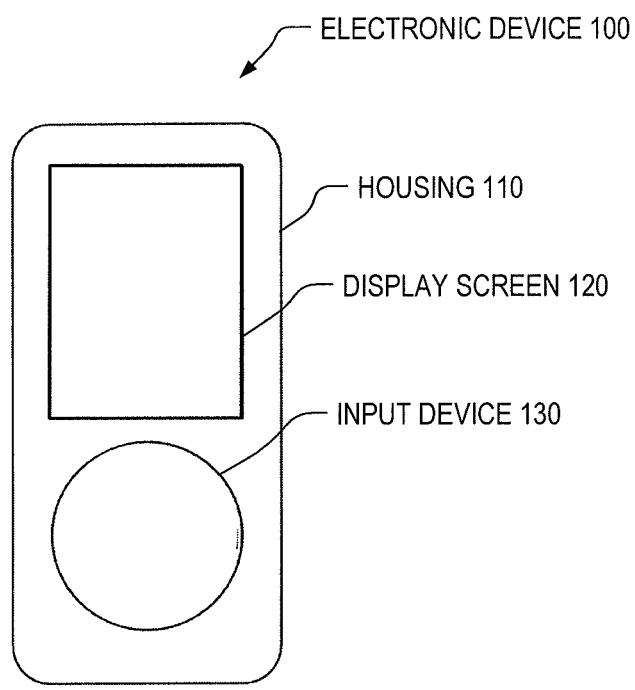
FIG. 1 illustrates an example of an electronic device.

FIG. 1 illustrates an example of an electronic device. The electronic device may be any consumer electronic product. The electronic device may be a computing device and more particularly it may be a media player, PDA, phone, remote control, camera and the like. In the embodiment illustrated in FIG. 1, electronic device 100 may correspond to a media player. The term "media player" generally refers to computing devices for processing media, such as audio, video or other images, including, for example, music players, game players, video players, video recorders and the like. These devices can be portable to allow a user to, for example, listen to music, play games or video, record video or take pictures wherever the user travels. In one embodiment, the electronic device can be a handheld device that is sized for placement into a pocket of the user. By being pocket sized, the device may be taken almost anywhere the user travels (e.g., the user is not limited by carrying a large, bulky and often heavy device, as in a portable computer). Furthermore, the device can be operated in the user's hands, thus no reference surface such as a desktop is required.

Electronic devices (e.g., media players) generally have connection capabilities that allow a user to upload and download data to and from a host device, such as a general purpose computer (e.g., desktop computer, portable computer, etc.). For example, in the case of a camera, photo images can be downloaded to the general purpose computer for further processing (e.g., printing). With regard to music players, for example, songs and play lists stored on the general purpose computer can be downloaded into the music player. In the embodiment illustrated in FIG. 1, electronic device 100 can be a pocket-sized hand-held media player (e.g., MP3 player) that allows a user to store a collection of music, photos, album art, contacts, calendar entries, and other desirable media assets. It should be appreciated however, that media players are not a limitation as the electronic device may be embodied in other forms as mentioned above.

As shown in FIG. 1, electronic device 100 may include housing 110 that can enclose various electrical components, such as integrated circuit chips and other circuitry, for example. The integrated circuit chips and other circuitry may include, for example, a microprocessor, memory (e.g., ROM, RAM), a power supply (e.g., battery), a circuit board, a hard drive or Flash (e.g., Nand flash) for storing media for example, one or more orientation detection elements (e.g., accelerometer) and various input/output (I/O) support circuitry. In the case of music players, the electrical components can include components for outputting music such as an amplifier and a digital signal processor (DSP) for example. In the case of video recorders or cameras the electrical components can include components for capturing images such as image sensors (e.g., charge coupled device (CCD) or complimentary oxide semiconductor (CMOS)) or optics (e.g., lenses, splitters, filters) for example. In addition to the above, the housing can also define the shape or form of the electronic device. That is, the contour of housing 102 may embody the outward physical appearance of electronic device 100 in one embodiment.

Electronic device 100 may also include display screen 120. Display screen 120 can be used to display a graphical user interface as well as other information to the user (e.g., text, objects, graphics). For example, display screen 120 may be a liquid crystal display (LCD). In one embodiment, the display screen can correspond to a X-by-Y pixel high-resolution display, with a white LED backlight to give clear visibility in daylight as well as low-light conditions. Display screen 120 can also exhibit a "wide screen" aspect ratio (e.g., similar to a 16:9 aspect ratio) such that it may be relatively easy to perceive portrait and landscape orientations.

Electronic device 100 may also include input device 130. Input device 130 can be configured to provide one or more control functions for controlling various applications associated with electronic device 100. For example, a control function can be used to move an object or perform an action on display screen 120 or to make selections or issue commands associated with operating electronic device 100. Input device 130 may be widely varied. In one embodiment, input device 130 can include a rigid sensor mechanism for detecting input. The rigid sensor mechanism can include, for example, a touch sensitive surface that provides location information for an object, such as a finger for example, in contact with or in proximity to the touch sensitive surface. In another embodiment, input device 130 can include one or more movable sensor mechanisms for detecting input. The movable sensor mechanism can include, for example, one or more moving members that actuate a switch when a particular area of input device 130 is pressed. The movable sensor mechanism may operate as a mechanical push button and perform a clicking action when actuated. In a further embodiment, input device 130 may include a combination of a rigid sensor mechanism and one or more movable sensor mechanisms.

Figure 2:
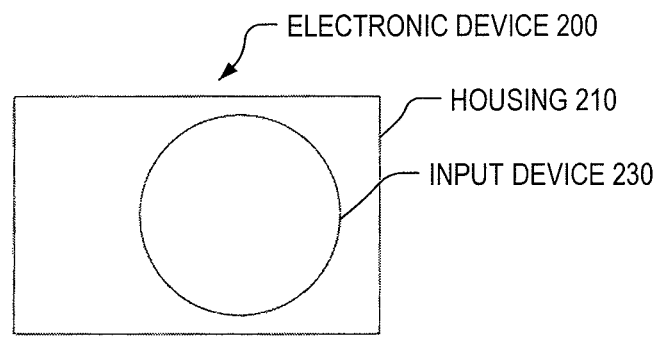
FIG. 2 illustrates an example of an electronic device.

FIG. 2 illustrates an embodiment of an electronic device without a display screen. In the embodiment illustrated in FIG. 2, electronic device 200 may include housing 210 that may generally correspond to housing 110, and input device 230 that may generally correspond to input device 130. The lack of a display screen allows electronic device 200 to be configured with smaller dimensions than those of electronic device 100. For example, in one embodiment, electronic device 200 may be less than two inches wide and less than two inches tall.

Figure 3:
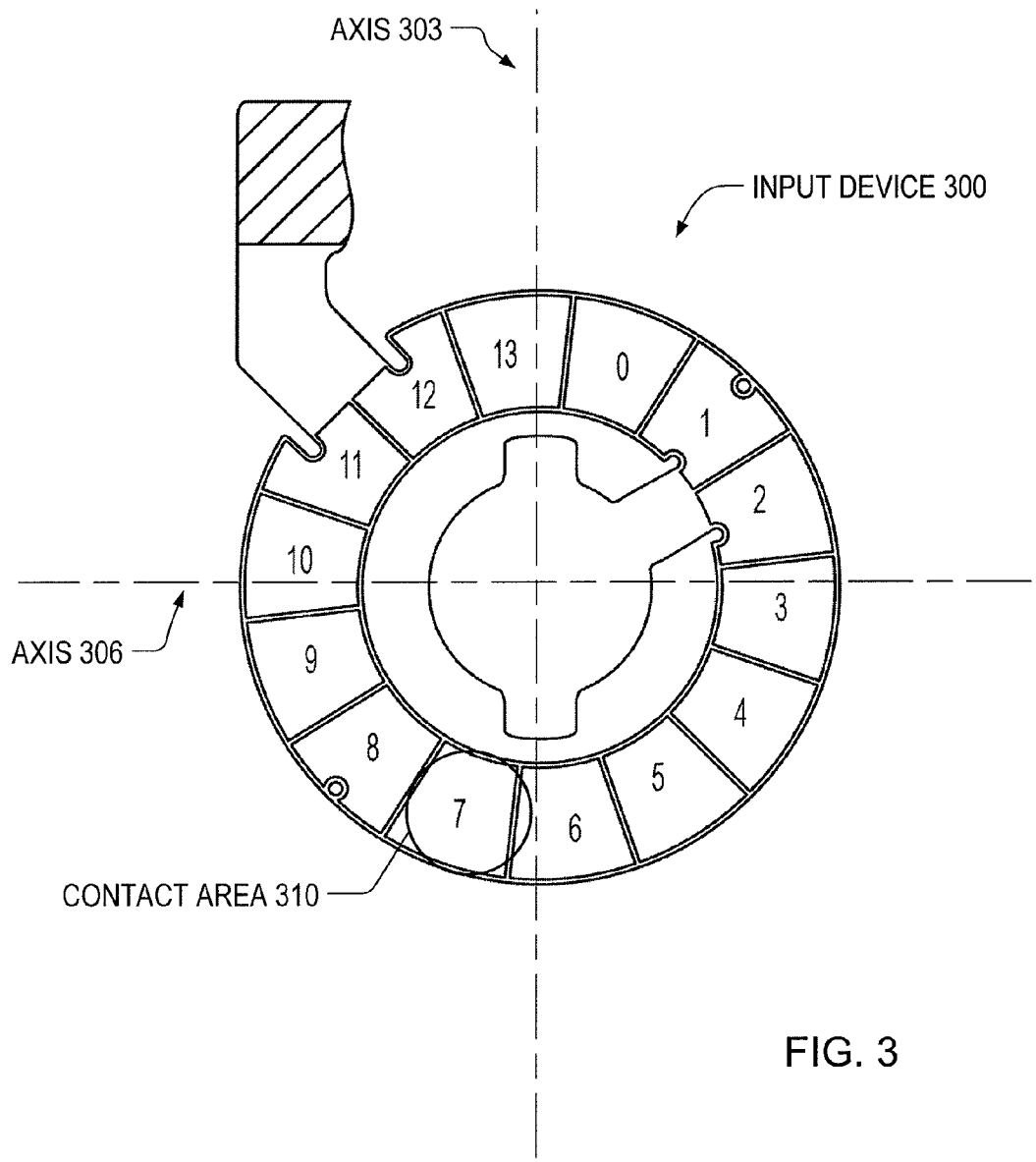
FIG. 3 illustrates an example of an input device.

FIG. 3 illustrates an example of an input device including an arrangement of capacitive sensor elements. In the embodiment illustrated in FIG. 3, input device 300, which may generally correspond to the input devices mentioned above, can be configured to sense touch events caused by an object, such as a finger for example, in contact with or in proximity to a touch sensitive surface placed over capacitive sensor elements 0-13. A sensor element can be provided at the center of input device 300, and can be configured as a movable button-type sensor element, a capacitive sensor element or as both a capacitive sensor element and a movable button-type sensor element for example. Sensor elements 0-13 and the center sensor element can be controlled by a controller.

Figure 19:
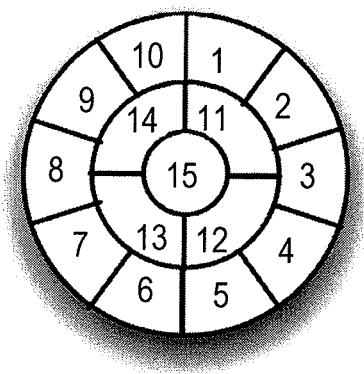
FIG. 19 illustrates an example of a 15-element capacitive sensor element arrangement.
Figure 20:
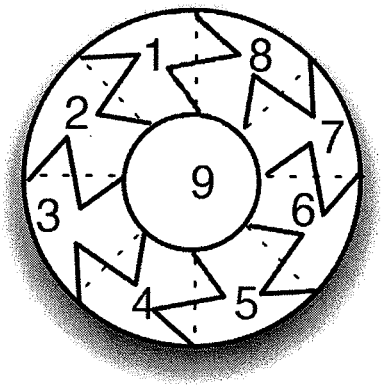
FIG. 20 illustrates an example of a 9-element capacitive sensor element arrangement.
Figure 21:
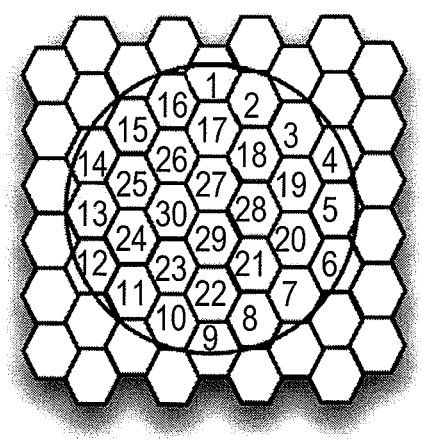
FIG. 21 illustrates an example of 30-element capacitive sensor element arrangement.

The arrangement of the sensor elements may be widely varied. For example, as shown in the embodiment illustrated in FIG. 3, sensor elements 0-13 can be circumferentially arranged relative to a center point. FIGS. 19-21 illustrate examples of different arrangements of capacitive sensor elements, such as a 15-element arrangement in FIG. 19, a 9-element arrangement in FIG. 20, and a 30-element element arrangement in FIG. 21. As illustrated in the embodiments of FIGS. 3 and 19-21, sensor elements in accordance with the present disclosure may be formed in any suitable pattern (e.g., annular, grid-like with columns and rows, etc.) or shape (e.g., honeycombed, zigzagged, etc.).

Touch events detectable using capacitive sensor elements of an input device in accordance with the present disclosure may be widely varied, and may include, for example, rotational motion, linear motion, taps, holds, and other gestures and any combination thereof provided by one (single touch input) or more than one (multi-touch input) of a user's fingers across the touch sensitive surface. The sensor elements can be configured to detect input based on self capacitance or mutual capacitance. In self capacitance, the "self" capacitance of a single electrode is measured as for example relative to ground. In mutual capacitance, the mutual capacitance between at least first and second electrodes is measured. In either case, each of the sensor elements can work independent of the other sensor elements to produce simultaneously occurring signals representative of different points of input on the touch sensitive surface at a particular time. Input sensed by the sensor elements of the input device may be widely varied, and may include, for example, touches and near-touches (that is, proximate but without actual contact) of a surface of the input device. The input device can include a controller configured to detect input by measuring a change in capacitance of the sensor elements.

Figure 4:
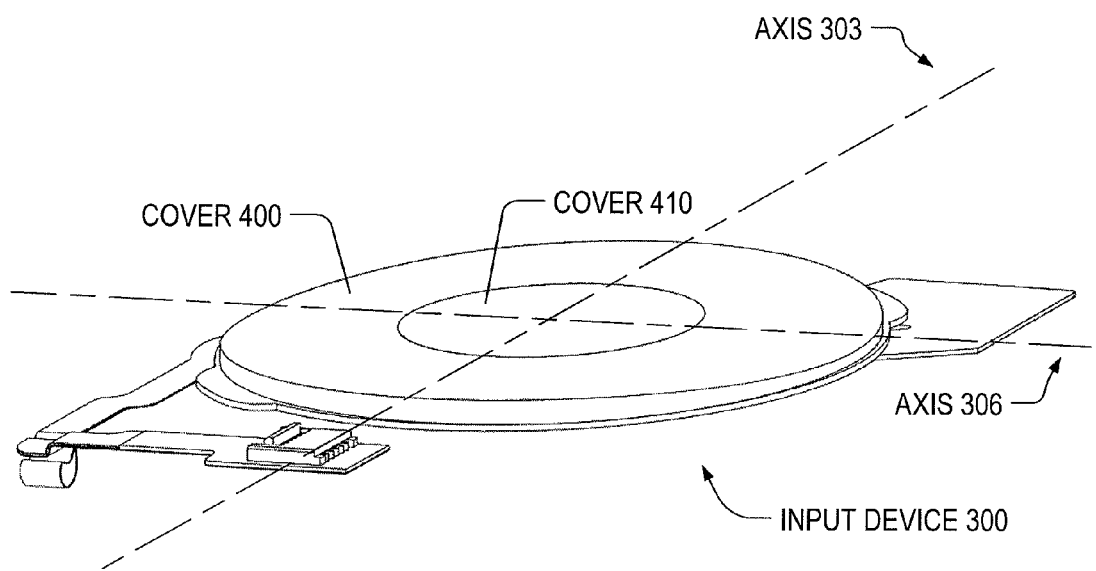
FIG. 4 illustrates an example of an input device with a cover of varying thickness.

FIG. 4 illustrates an example of an overlay having a curvature that can placed over sensor elements 0-13 of input device 300. As shown in the embodiment illustrated in FIG. 4, input device 300 can include a touch-sensitive surface, cover 400, placed over capacitive sensor elements 0-13. Cover 400 can be made of any dielectric material, such as plastic or glass for example, that can enable a capacitance to form between an object in contact with or in proximity to cover 400. Input device 300 can also include cover 410 placed over the center sensor element. As illustrated in FIG. 4, the thickness of cover 400 can be uniform along axis 303, and greater than a decreasing thickness of cover 400 along axis 306.

Figure 5:
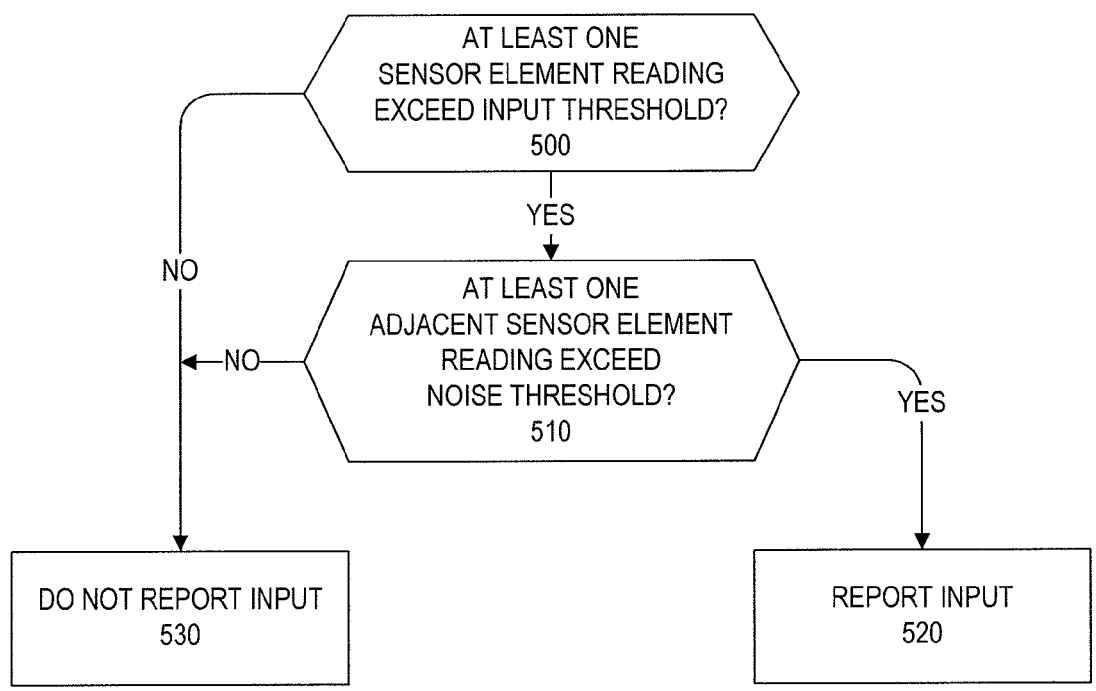
FIG. 5 illustrates an example of an input reporting process.

FIG. 5 illustrates an example of an input reporting process that can be implemented by input device 300. The input reporting process can implement an input reporting rule that specifies that an input, such as a touch event on a touch sensitive surface for example, can be reported (block 520) if at least one sensor element of the input device provides (block 500) a strong input signal (e.g., a signal level above an input threshold) and at least one adjacent sensor element provides (block 510) at least a weak input signal (e.g., a signal level above a noise threshold). If either of these conditions are not met, the rule specifies that input device 300 is not to report an input (block 530).

A signal level in the context of this disclosure refers to a level of a measure, such as capacitance for example, that is sensed by a controller in a sensing operation associated with a sensor element. A signal level without an object in contact with or in proximity to a touch sensitive surface of the input device generally indicates noise. A noise threshold refers to a maximum signal level below which a signal level generally indicates noise and a baseline process can occur. An input threshold refers to a minimum signal level above which a signal level generally indicates that an input has been applied to the input device. The input threshold is generally greater than the noise threshold.

Figure 6:
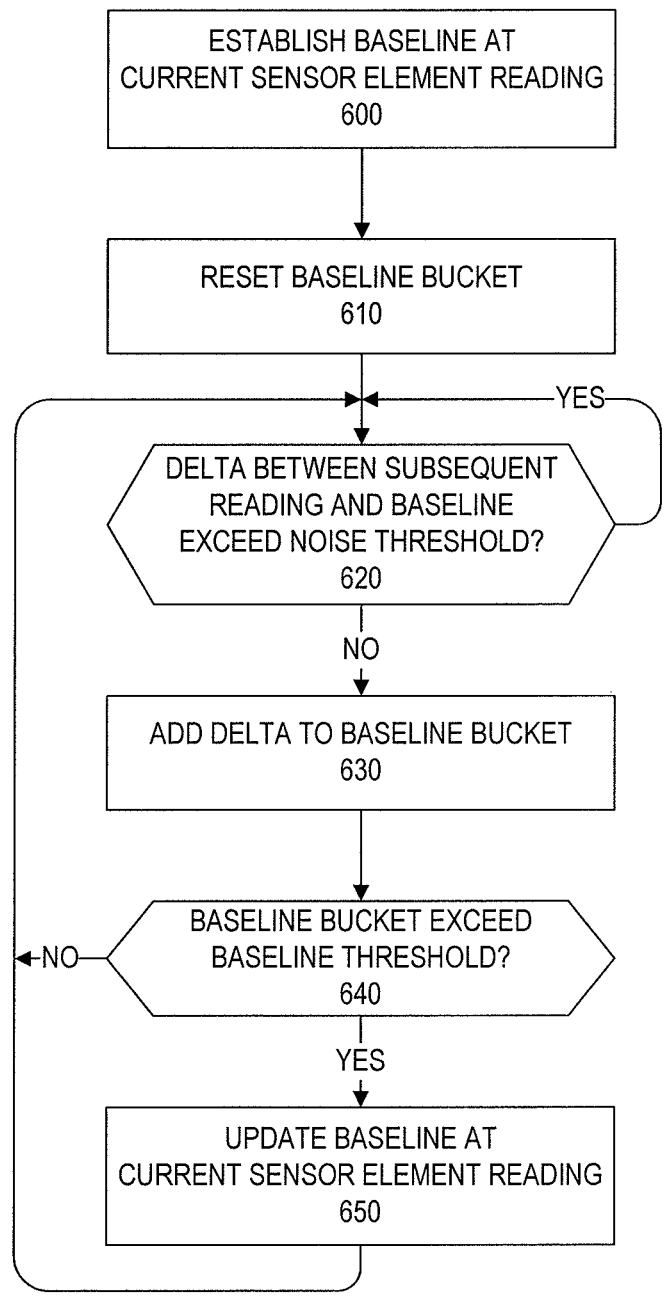
FIG. 6 illustrates an example of a baseline process.

FIG. 6 illustrates an example of a baseline process that can be implemented by input device 300. For each sensor element of the input device, the input device can initially establish (block 600) a baseline level at the current signal level of the sensor element and reset (block 610) a baseline bucket to zero. If a delta between a subsequent signal level of the sensor element and the baseline level exceeds (block 620) a noise threshold, the input device does not perform a baseline operation and waits until the subsequent sensor element reading, since a signal level above the noise threshold could indicate an input. If the delta meets or falls below the noise threshold, the input device adds (block 630) the delta to the baseline bucket. If the added delta causes the baseline bucket to exceed (block 640) a baseline threshold, the input device updates (block 650) the baseline level at the current signal level of the sensor element. If the added delta does not cause the baseline bucket to exceed the baseline threshold, the input device does not perform a baseline operation and waits until the subsequent sensor element reading. The noise and input thresholds can be offsets of the current baseline level.

FIGS. 7 and 8 illustrate an example of an input detection in accordance with one embodiment. In the illustrated embodiment, FIG. 7 illustrates object 710 (e.g., a finger) fully covering sensor element 4 of input device 300, while only partially covering neighboring sensor elements 700. Since graph 800 of FIG. 8 indicates at least one sensor element (sensor element 4) providing a signal level greater than input threshold 810 and at least one adjacent sensor element (sensor elements 3 and 4) providing a signal level greater than noise threshold 820, input device 300 can report an input based on the proximity of object 710 to the sensor elements in accordance with the input reporting process of FIG. 5. It is noted that although input threshold 810 and noise threshold 820 are illustrated in a level manner in FIG. 8, they can be varied in a suitable manner on a per sensor element basis.

By relying on a combination of a strong input signal with at least a weak input signal from adjacent sensor elements to report an input, the input reporting process of FIG. 5 can prevent the occurrence of a spike (e.g., a strong signal caused by radio frequency interference) on a single sensor element from registering as a false touch event. However, if an adjacent sensor element exhibits a weak response at the lower end of its dynamic range, it may not be able to differentiate a weak input signal (e.g., a signal level above a noise threshold but below the input threshold) from noise (e.g., a signal level below a noise threshold), causing a false negative to occur in response to an actual touch event.

In particular, certain factors can cause the signal level of a partially covered sensor element to be particularly weak. For example, in input device 300 the thickness of cover 400 can be greatest along axis 303 as described above, and the traces can configured such that the trace from the controller to sensor element 6 (located under the thick portion of cover 400) is longer than the traces to the other sensor elements. The thickness of cover 400 and parasitic influences associated with a long trace can cause sensor element 6 to exhibit a weak response at the low end of its dynamic range. This can be evident when a small object, such as a child's finger for example, fully covers only sensor element 7 and partially covers only sensor element 6, for example, as illustrated by contact area 310 in FIG. 3.

Figure 9:
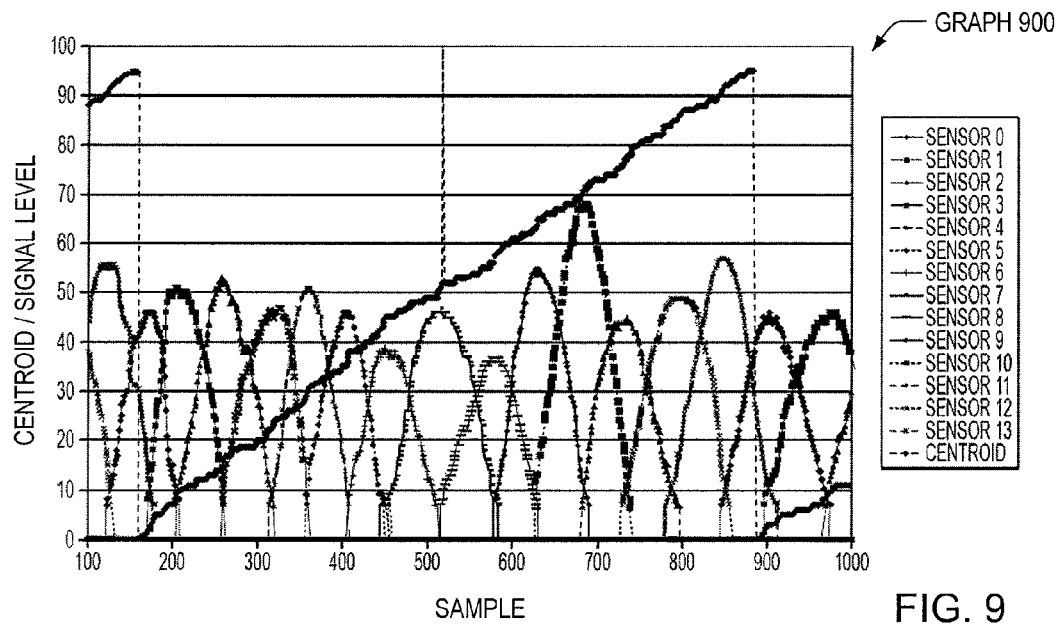
FIGS. 9 and 10 illustrate example graphs of sensor element readings of an input device.
Figure 10:
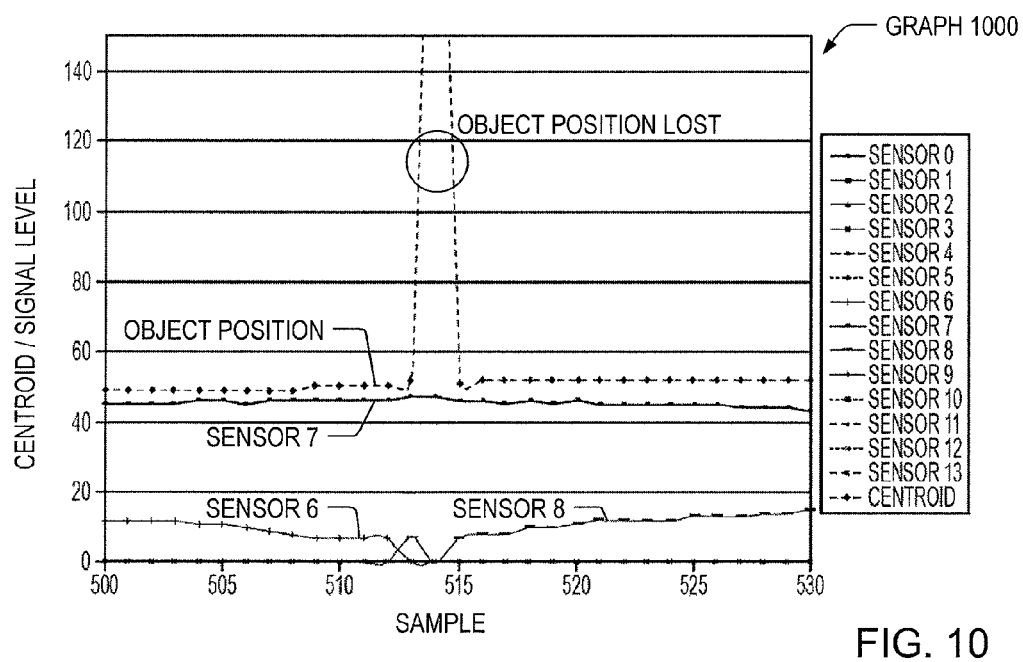

FIGS. 9 and 10 illustrate an example of this weak response situation. In particular, graph 900 of FIG. 9 depicts a signal level associated with each sensor element of input device 300 as an object scrolls around the surface of the input device (illustrated by the hills of the graph) along with the object position based on a centroid calculation (illustrated by the diagonal line). The y-axis has 96 units that represent both positions and signal levels. Regarding positions, the y-axis can represent 0 to 95 positions around the wheel from sensor element 0 to sensor element 13. Regarding signal levels, the y-axis can represent sensor levels with a noise threshold set at 7, an input threshold set in the 20s (e.g., the input threshold can vary depending on the sensor element), and an invalid position set at 127 or 255 for example. The x-axis has 1000 units that can represent samples (e.g., raw counts measured per sensor element) at consecutive scan times.

As illustrated by graph 900, the input device can report continuous input during the scrolling action, in accordance with the input reporting process of FIG. 5, if at least one sensor element reading is in the 20s and at least one adjacent sensor element reading is above 7. However, as evidenced by the spike in the middle of graph 900, and further illustrated by a zoomed-in view of where the spike occurs in graph 1000 of FIG. 10, the input can be lost when the object is located at contact area 310. This loss of object position at contact area 310 can be caused by sensor 6's brief inability to provide a signal level greater than the noise threshold, even though an object partially covers sensor element 6. This can cause the input device to report that the object is not touching the input device at contact area 310, which can cause a slight discontinuity in the user interface experience.

Figure 11:
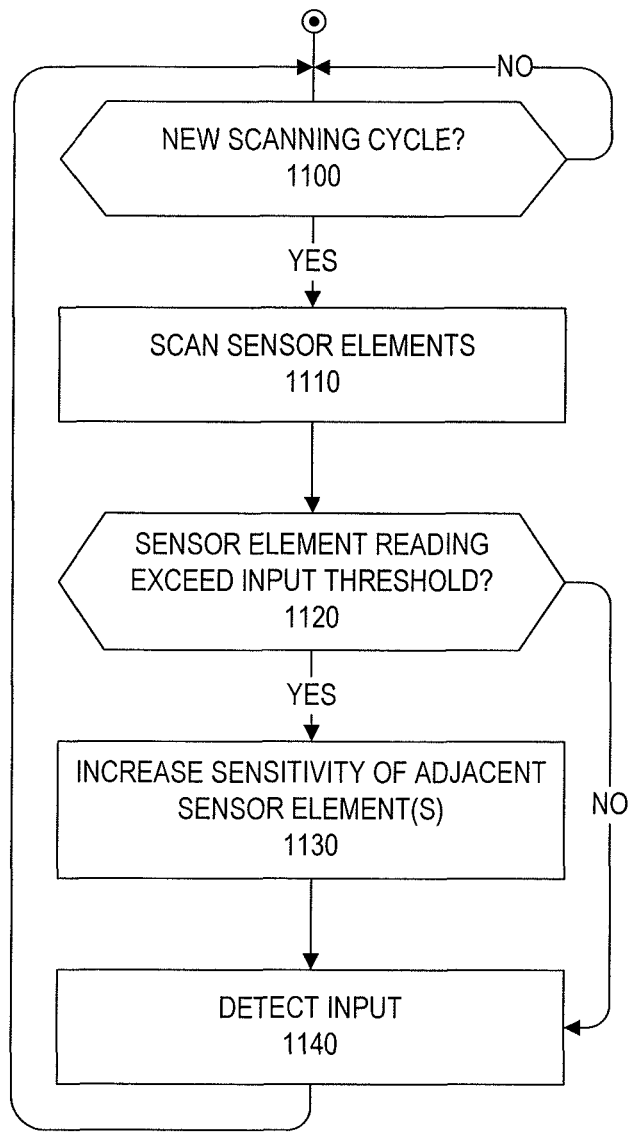
FIGS. 11-13 illustrate examples of input detection processes.

Accordingly, the input device can be configured to compensate for a weak sensor element at the low end of its dynamic range by increasing its sensitivity in certain situations. For example, in one embodiment, the input device can increase a weak sensor element's sensitivity when an adjacent sensor provides a strong input signal. In particular, as illustrated in FIG. 11, during each scan cycle (block 1100), the controller can scan (block 1110) all of the sensor elements of the input device. Following the scan, if a signal level of a sensor element is found to have exceeded (block 1120) an input threshold associated with that sensor element, the controller can increase (block 1130) the sensitivity of the adjacent sensor elements prior to performing (block 1140) an input detection process on the scanned data.

The sensitivity of the weak sensor element can be increased in a variety of ways. In one embodiment, the input device can increase the sensitivity of the sensor element by reducing a noise threshold associated with the sensor element. In another embodiment, the input device can increase the sensitivity of the sensor element by boosting a signal level associated with the sensor element, such as, for example, by multiplying the scanned signal level by suitable factor. The reduction of noise threshold and/or boosting of signal can be dependent on whether the adjacent sensor element reading exceeds an input threshold for a period of time. This can avoid increasing the sensitivity of sensor elements based on false positives of their adjacent sensor elements.

The amount by which the sensitivity is increased can also be widely varied. For example, in one embodiment, the sensitivity can be increased in proportion to the strength of the signal level of the adjacent sensor element that exceeds the input threshold. In another embodiment, the sensitivity can be increased based on an ambient temperature associated with the input device, since temperature can influence the input detection process.

The increase in sensitivity can also be limited to those sensor elements whose signal levels meet or fall below the input threshold level. In this manner, when an object fully covers several sensor elements, such as in connection with an input device with a sensor arrangement similar to those of FIGS. 19-21, and partially covers sensor elements around the periphery of the fully covered sensor elements, only the sensitivity of the peripheral sensor elements can be increased to save processing time and power.

Figure 12:
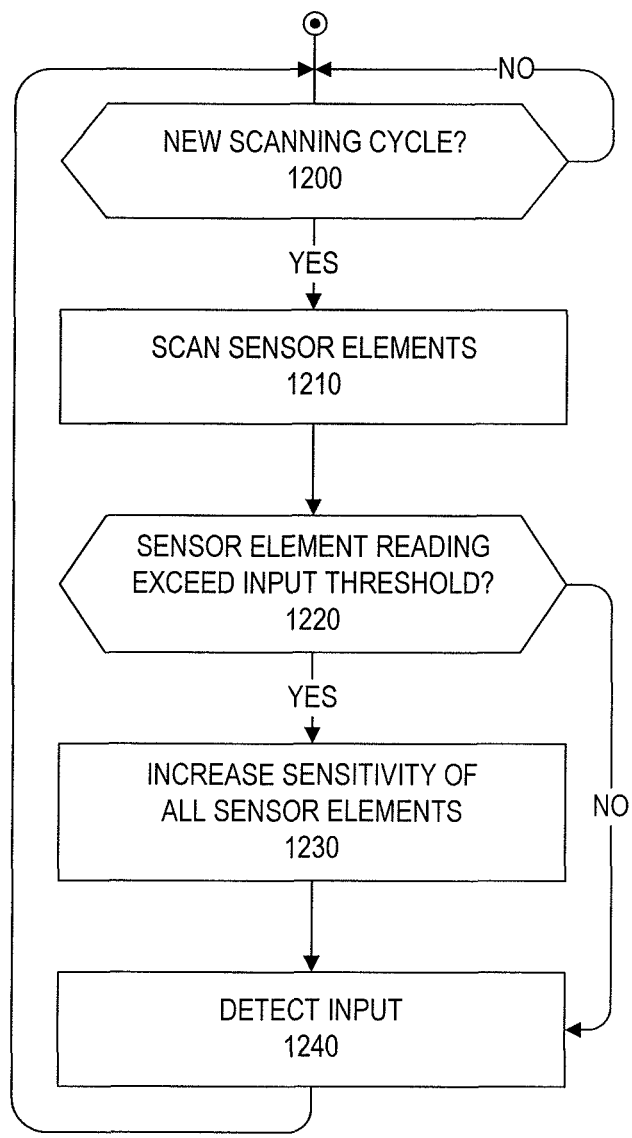

In another embodiment, the input device can increase the sensitivity of all sensor elements when any of the sensor elements of the input device provides a strong input signal. In particular, as illustrated in FIG. 12, during each scan cycle (block 1200), the controller can scan (block 1210) all of the sensor elements of the input device. Following the scan, if a signal level of any sensor element is found to have exceeded (block 1220) an input threshold associated with that particular sensor element, the controller can increase (block 1230) the sensitivity of all of the sensor elements prior to performing (block 1240) an input detection process on the scanned data. Because this embodiment does not require identifying adjacent sensor elements as required by the embodiment of FIG. 11, less instructions can be used to program the controller which can provide cost savings and space savings in connection with the controller chip. However, increasing the sensitivity of sensor elements that are not adjacent to a sensor element with a strong input signal can increase the likelihood of detecting a false positive caused by noise, for example.

Figure 13:
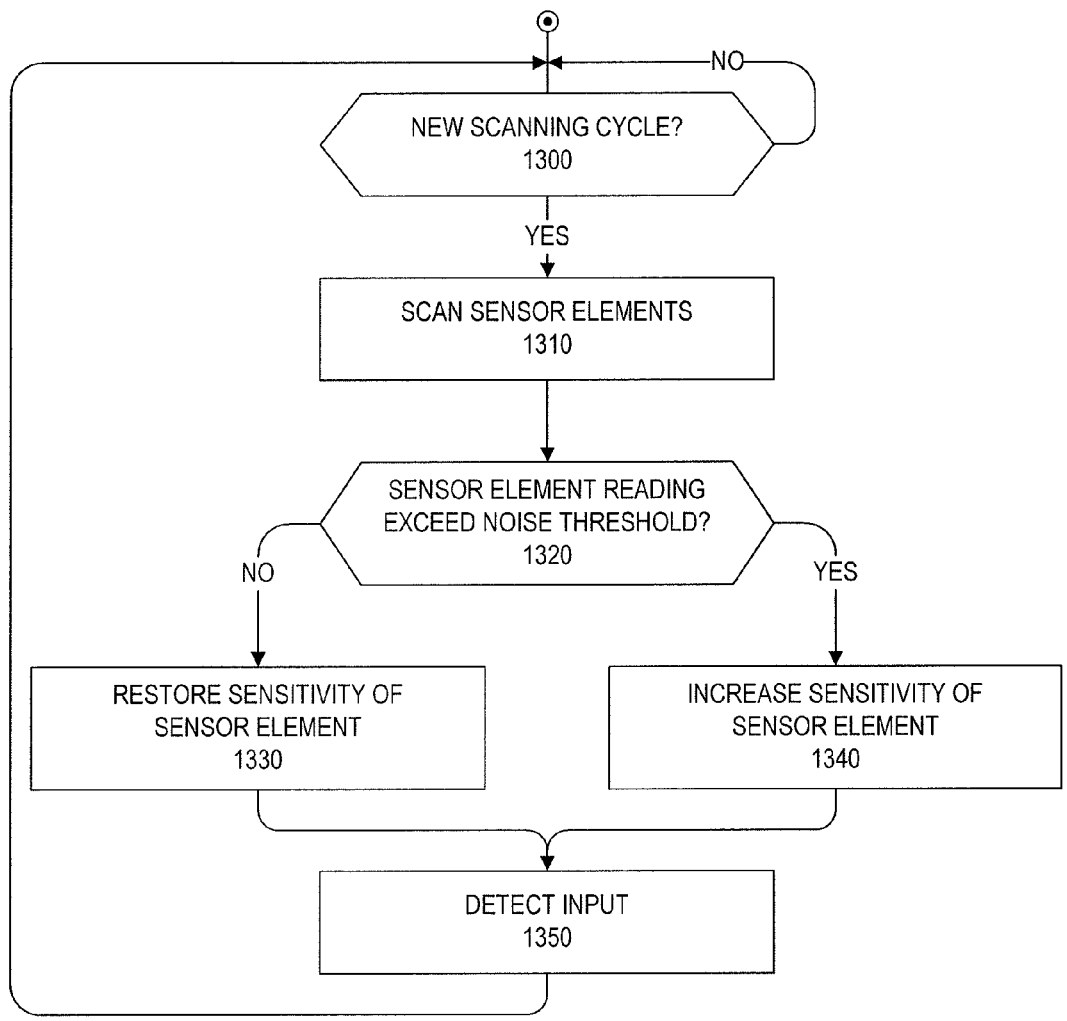

In a further embodiment, the input device can apply hysteresis to a weak sensor element, whereby the sensitivity of the weak sensor element can be increased when a signal level of the weak sensor exceeds a noise threshold, and the sensitivity can be restored when a signal level of the weak sensor meets or falls below the noise threshold. In particular, as illustrated in FIG. 13, during each scan cycle (block 1300), the controller can scan (block 1310) all of the sensor elements of the input device. Following the scan, if a signal level of a sensor element is found to have exceeded (block 1320) a noise threshold associated with that sensor element, the controller can increase (block 1340) the sensitivity of that sensor element. If the signal level of a sensor element is found to have met or fallen below the noise threshold, the controller can restore (block 1330) the sensitivity of that sensor element. The controller can subsequently perform (block 1350) an input detection process on the scanned data. This embodiment can be beneficial for preventing the loss of an object when the object moves from a weaker sensor to a stronger sensor, such as an object moving from sensor element 6 to sensor element 7 of input device 300 in the example described above.

For example, all sensor elements or each sensor element can be associated with two noise thresholds—a higher noise threshold (NT_H) and a lower noise threshold (NT_L). When a signal level of a sensor element exceeds NT_H, the noise threshold can be reduced from NT_H to NT_L, increasing the sensitivity of the sensor element. Conversely, when a signal level of a sensor element meets or falls below NT_H, the noise threshold can be increased from NT_L to NT_H, restoring the sensitivity of the sensor element. The change in noise threshold can be done gradually or in a few steps, for example.

Other embodiments can also improve input detection associated with weak sensor elements. For example, in one embodiment, a variable threshold table—in which a distinct sensor threshold (e.g., noise and/or input threshold) can be associated with one or more sensor elements—can be implemented to compensate for any aspects that may weaken a particular sensor element, such as sensor configuration and overlay thickness for example. As depicted by graph 1400 in FIG. 1400, different thresholds, such as noise thresholds and input thresholds, can be assigned to each sensor element of an input device. Accordingly, a controller can look up in the table which threshold applies to which sensor element when performing an input detection process on the scanned data.

Figure 14:
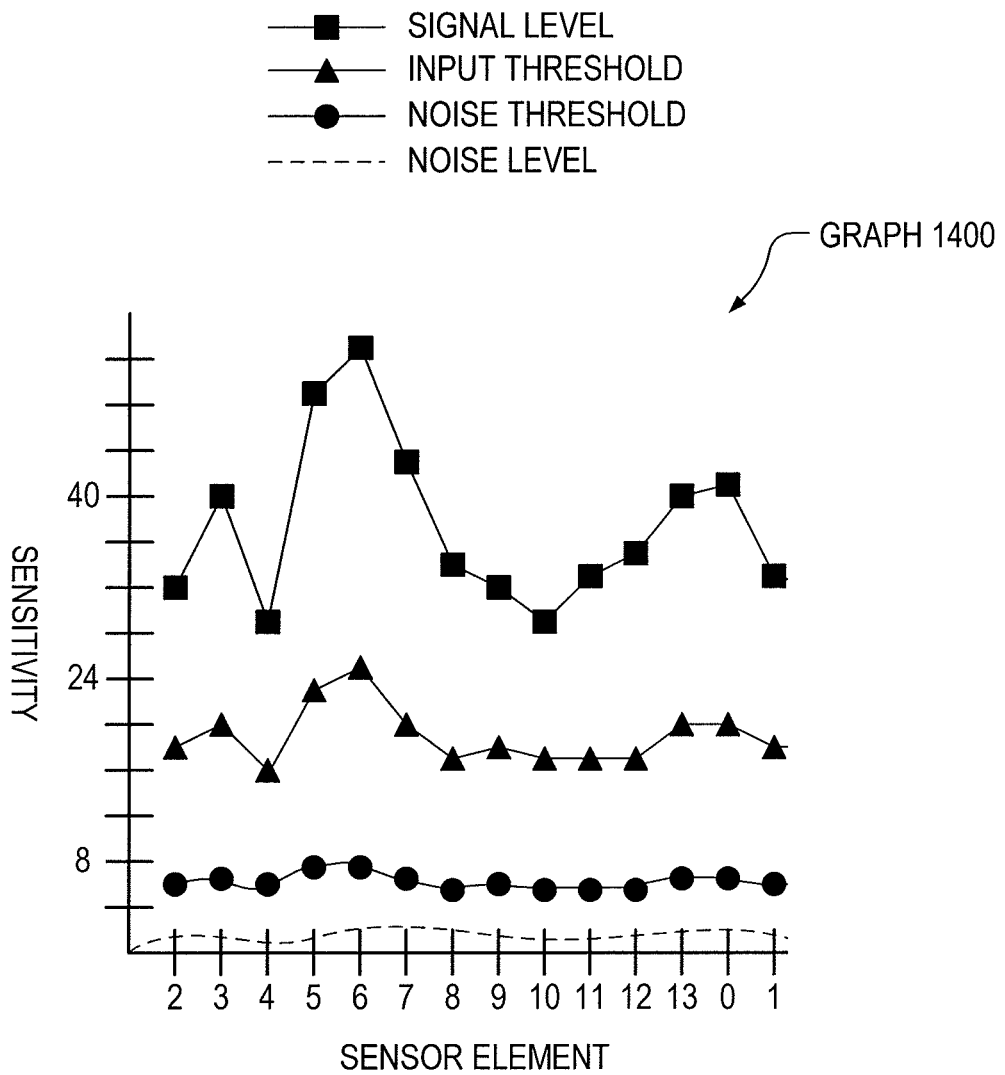
FIG. 14 illustrates an example of a graph of variable sensor element sensitivities of an input device.
Figure 15:
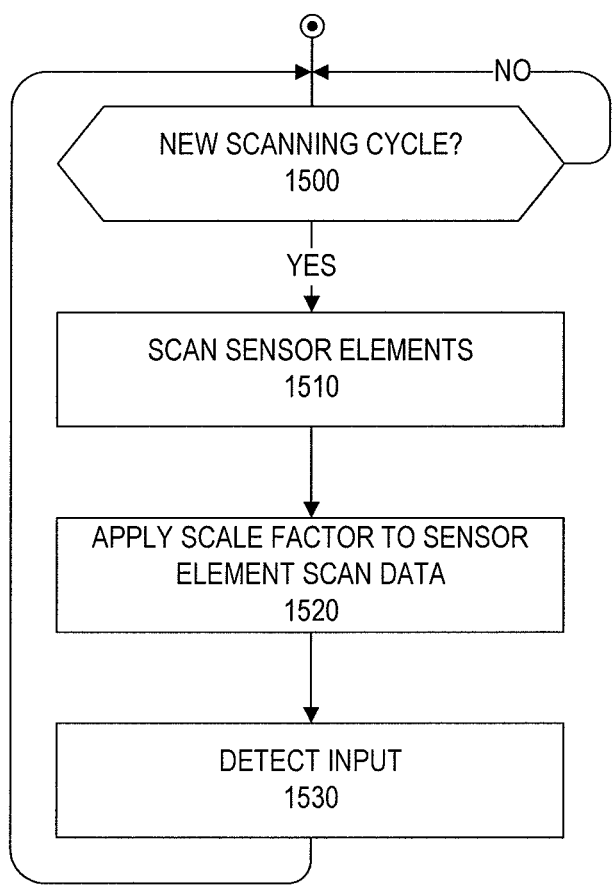
FIG. 15 illustrates an example of an input detection process.

In another embodiment, input detection can be improved by customizing a scale factor associated with distinct sensor elements of the input device in order to normalize the associated sensing operations. In particular, as illustrated in FIG. 15, during each scan cycle (block 1500), the controller can scan (block 1510) all of the sensor elements of the input device. The controller can apply (block 520) a scale factor to the scan data associated with each sensor element to normalize the scan data. For example, just after raw data capture and baseline offset subtraction, the raw data from each sensor element channel can be multiplied by a pre-defined number, customized for the particular sensor element associated with that channel, to normalize the scale factor. The pre-defined number can be set in a variety of ways, such as being pre-set for all units of the input device or custom calibrated on a unit by unit basis for example. These numbers can be stored and accessed in a lookup table similar to that of the embodiment depicted in FIG. 14. Accordingly, the controller can look up in the table which scale factor applies to the scan data for which sensor element when performing (block 530) an input detection process on the scanned data.

Figure 16:
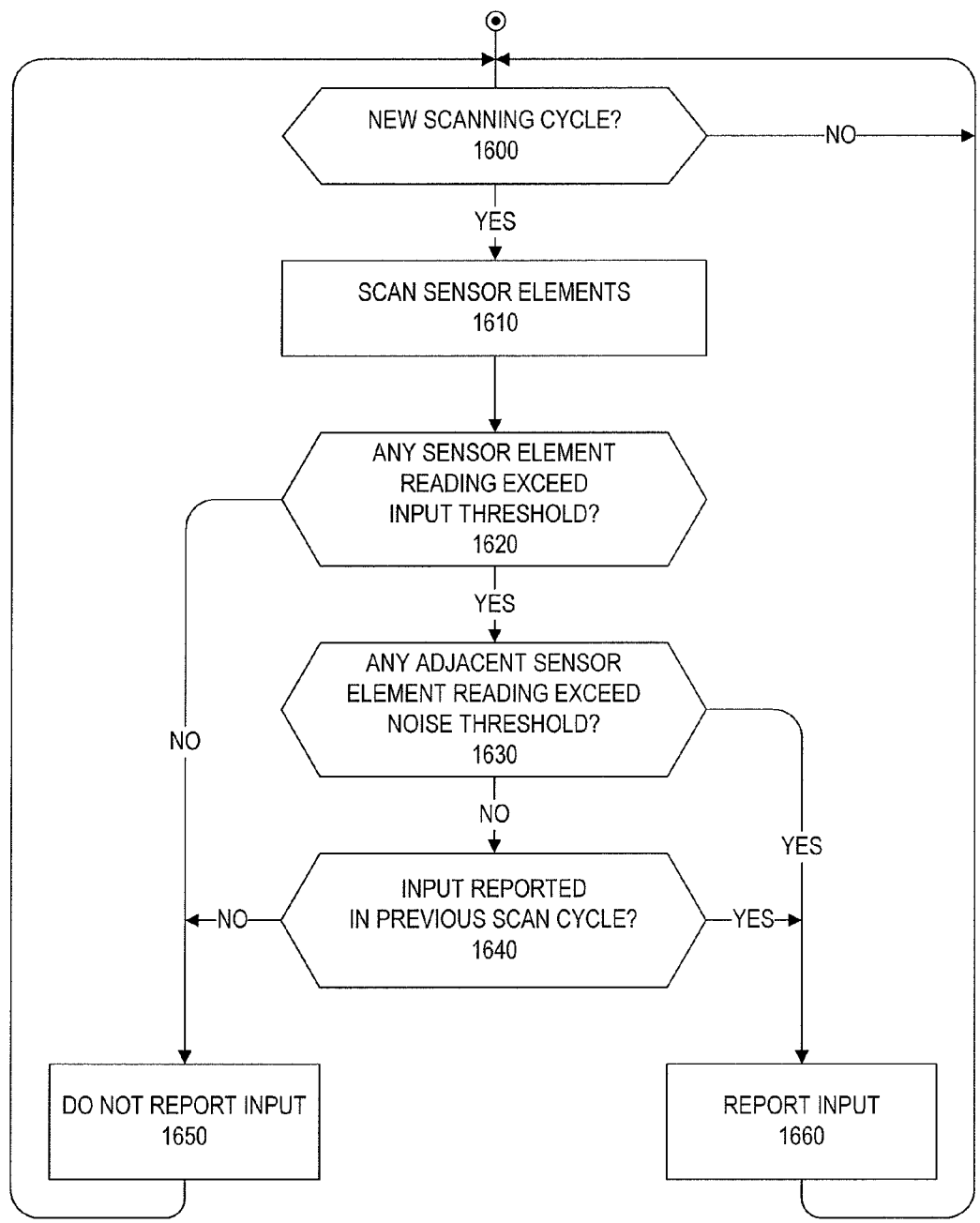
FIG. 16 illustrates an example of an input reporting process.

In yet another embodiment, the input reporting rule described above can be modified to allow the reporting of a single strong input signal, without an accompanying weak or strong input signal, when an input has been reported in a preceding scan cycle. In particular, as illustrated in FIG. 16, during each scan cycle (block 1600), the controller can scan (block 1610) all of the sensor elements of the input device. The controller can determine (block 1620) whether a signal level associated with any sensor element exceeds an input threshold. If no signal level exceeds an input threshold, the controller can decline (block 1650) to report an input. If a signal level exceeds an input threshold, the controller can determine (block 1630) whether a signal level associated with any adjacent sensor element exceeds a noise threshold. If a signal level associated with an adjacent sensor element exceeds a noise threshold, the controller can report (block 1660) an input in accordance with the input reporting rule described above, for example. If no signal level associated with an adjacent sensor element exceeds a noise threshold, the controller can determine (block 1640) whether an input was reported in a previous scan cycle. If an input was reported in a previous scan cycle, the controller can report (block 1660) an input. If an input was not reported in a previous scan cycle, the controller can decline (block 1650) to report an input.

By modifying the input reporting rule as described above, the user interface experience for the user can be preserved in situations that could otherwise result in a valid input being dropped. For example, when a continuous scrolling action occurs around input device 300, but an adjacent sensor reading during a particular scan cycle is too weak to enable an input to be registered according to the original input reporting rule described above, the modified input reporting rule can enable the input to be registered if an input was reported in a previous cycle. In another embodiment, the modified input reporting rule could further require that the previously reported input occur at a location near the current sensor element location. These rule modifications can therefore relax certain requirements of the original input reporting rule, such as the adjacent sensor element aspect that is directed to eliminating spurious noise from producing erroneous input, in situations in which it is likely that an isolated signal level exceeding an input threshold is the result of an intended input and not noise. In such situations in which scan data is available for only one sensor element, the input device can report the location of the input as the centroid of the associated sensor element.

Additional methods can be used to improve the sensing operation of the weak sensor. In one embodiment, for example, if the input device is currently reporting an input (e.g., in accordance with the input reporting process of FIG. 5), it can continue to report the input even if the rule is violated in the vicinity of the object for a number of counts (e.g., positional units). In another embodiment, the signal to noise ratio (SNR) can be improved by scanning the sensor elements with a higher sensitivity, and then normalizing down the scan results to reduce the affect of noise, effectively lowering the noise threshold.

In a further embodiment, the input device can change the sensing method for the weak sensor, possibly at the expense of more power. For example, interrupt driven sensing can be utilized so that the chip can be put to sleep while sensing is in process, thereby preventing processing noise associated with the chip from impacting the reading of the weak sensor when information is processed by the chip in parallel with the sensing operation. It is understood that the embodiments described above are not exclusive embodiments, and can be combined in various ways as appropriate.

The present disclosure is not limited to the input devices illustrated herein. Rather, an input device of any suitable technology or configuration for enabling detection of input in accordance with the teachings of the present disclosure can be utilized. For example, the input device can include capacitive touch sensor elements and contact switch elements forming mechanical push buttons arranged on different surfaces of a substrate, such as a flexible printed circuit board ("flex") for example.

The flex can have three conductive layers—a top, middle and bottom conductive layer for example. The top conductive layer can include conducting pad electrodes forming capacitive touch sensor elements, the bottom conductive layer can include a conducting surface forming a ground plane around conducting elements forming contact switch elements, and the middle conductive layer can include traces connecting the controller to the capacitive touch sensor elements, the contact switch elements and the ground plane.

The flex can be formed of a multi-layer substrate, and the conductive layers can be arranged on a surface of one or both sides of the substrate layers. In one embodiment, the conductive layer can include a copper layer coated on a substrate layer, which can be etched to form the appropriate sensor element and/or ground plane and then glued to another similar substrate layer.

Each of the substrate layers can include a dielectric material to separate the conductive layers. The dielectric material can be formed of a polyamide or other plastic for example. The traces can form sensor lines and connect the controller to the sensor elements through vias formed in the substrate layers and filled with conductive material. An advantage of routing traces and forming contact switch elements in one or more conductive layers different than the conductive layer forming the capacitive touch sensor elements can be to reduce parasitic capacitance, which can reduce the performance of the capacitance touch sensor elements.

Figure 17:
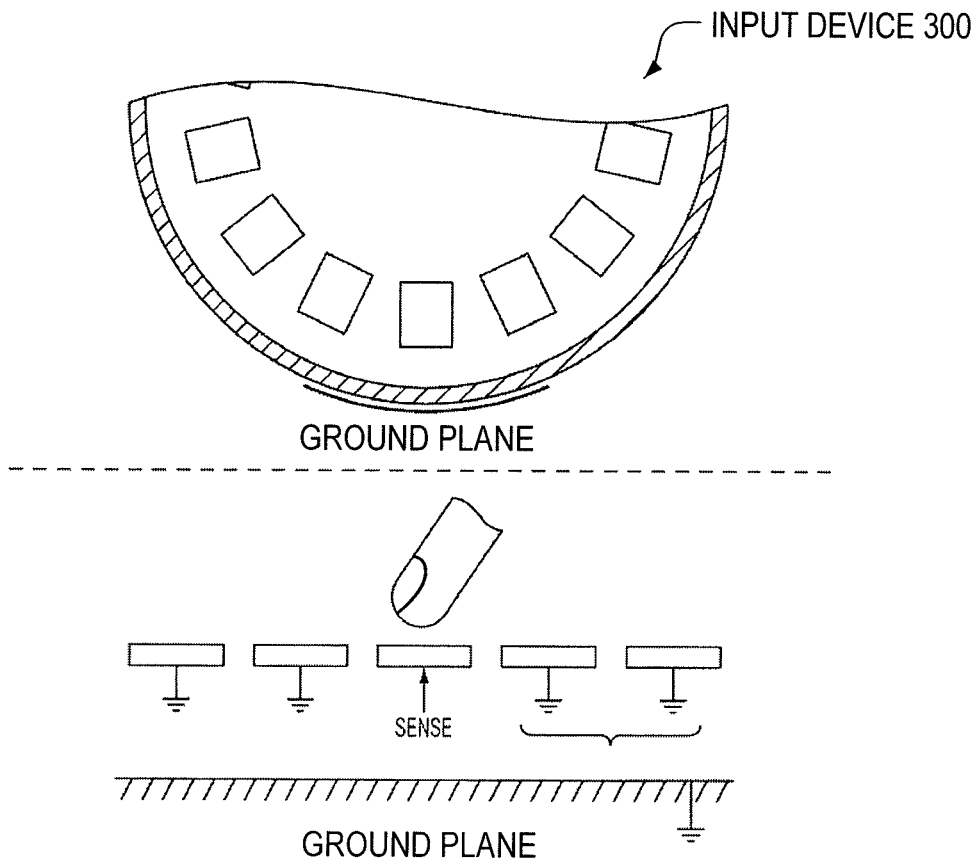
FIG. 17 illustrates an example of a sensing process.

FIG. 17 illustrates an example of a sensing process in accordance with one embodiment. During a scan, a controller associated with input device 300 can perform a sensing operation for each of sensor elements 0-13 in consecutive fashion. When a sensing operation is being performed in association with one of the sensor elements, the other sensor elements can be grounded.

Figure 18:
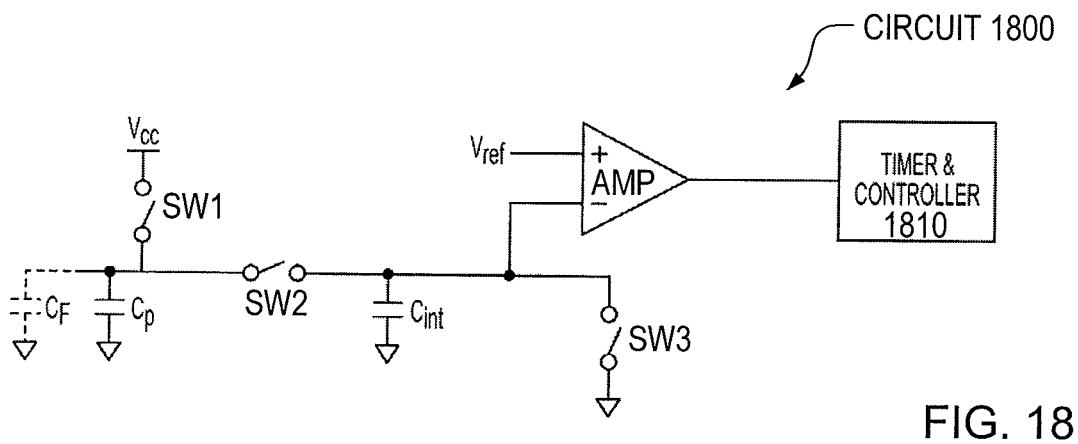
FIG. 18 illustrate examples of sensing circuits.

FIG. 18 illustrates an example of a sensing circuit that can implement the sensing process of FIG. 17. A parasitic capacitance Cp can represent the sum of all capacitance from a sensor element associated with a sensing operation to surrounding conductive material (e.g., sensor element to ground plane and sensor element to grounded sensor elements). The capacitance Cf associated with an object such as a finger over the sensor element can increase the total capacitance C (C=Cp+Cf) associated with the sensor element above the input threshold. Time and controller 1810 of sensing circuit 1800 can measure a capacitance associated with a sensor element by using relatively small capacitance Cp+Cf to charge relatively large capacitance Cint (associated with an integration capacitor) to voltage threshold Vref. Sensing circuit 1800 can produce a measurement value reflecting how long it takes (e.g., how may switching cycles as described below) to charge Cint to Vref. For example, a measurement value reflecting an input (e.g., the above signal levels) can result from the time it takes for Cp+Cf to charge Cint to Vref minus the time it takes for Cp to charge Cint to Vref. Expressed formulaically, input=time(Cp+Cf)−time(Cp).

In operation, sensing circuit 1800 can operate as follows:
step 0: reset and start timer (assume Cint has no charge)
step 1: open transfer switch SW2, close charge switch SW1
  (these can switch alternately very fast, e.g., MHz)
  Cp+Cf are charged to Vcc (e.g., 3.0 V)
step 2: open charge switch SW1, close transfer switch SW2
  Cp+Cf charge flows to Cint
  repeat step 1 and step 2 until Cint reaches Vref (e.g., 1.1 V)
step 3: stop timer
step 4: open charge switch SW1, open transfer switch SW2, close discharge switch SW3: discharges Cint to no charge state
  open discharge switch SW3 when done
  repeat for all sensor elements The input detection processes described above can improve the input detection of weak sensors in a variety of situations, and is not limited to situations in which an exterior surface covering the input device has a curvature and/or certain sensor elements have long traces. For example, the disclosed input detection processes can improve the reliability of sensor elements that can be considered weak for having different surface areas than their counterparts. A sensor element having a smaller surface area can have a different sensitivity to an input than that of a sensor element having a larger surface area because capacitive coupling between two conducting elements (such as a sensor element and an object) is stronger when the surface area of the conducting elements is greater.

This can be advantageous in situations in which there is a large difference between sensor element surface areas (e.g., the surface areas of sensor element 0-13 relative to the surface area of the center sensor element of input device 300 if configured as a capacitive sensor element) or a small difference between sensor element surface areas (e.g., the small differences in the surface areas of sensor elements 0-13 due to mechanical necessity, such as holes for locating during assembly, other notches to make room for other pieces of hardware in the unit, or manufacturing limitations such as minimum gap requirements between punched sections for example).

Figure 22:
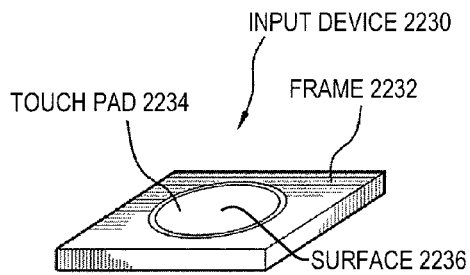
FIGS. 22-24 illustrate an example of operations of an input device.
Figure 23:
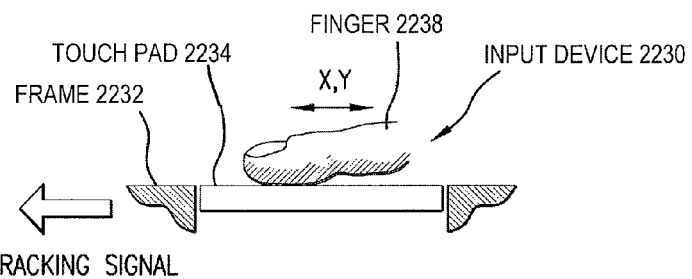
Figure 24:
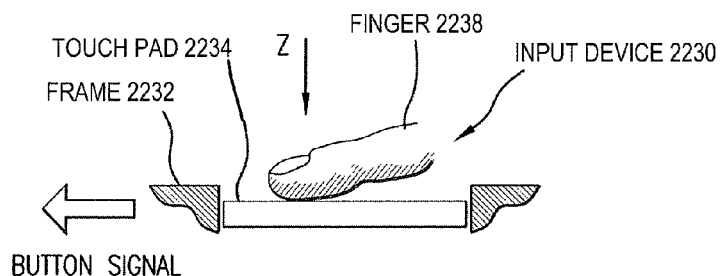

FIGS. 22-24 illustrate operations of an input device according to some embodiments of the present disclosure. For example, the input device may generally correspond to any of the input devices mentioned above. In the example shown in FIG. 22, input device 2230 can be configured to send information or data to an electronic device in order to perform an action on a display screen (e.g., via a graphical user interface). Examples of actions that may be performed include, moving an input pointer, making a selection, providing instructions, etc. The input device can interact with the electronic device through a wired connection (e.g., cable/connector) or a wireless connection (e.g., IR, Bluetooth, etc.). Input device 2230 may be a stand alone unit or it may be integrated into the electronic device. As a stand alone unit, the input device can have its own enclosure. When integrated into an electronic device, the input device can typically use the enclosure of the electronic device. In either case, the input device can be structurally coupled to the enclosure, as for example, through screws, snaps, retainers, adhesives and the like. In some cases, the input device may be removably coupled to the electronic device, as for example, through a docking station. The electronic device to which the input device may be coupled can correspond to any consumer related electronic product. For example, the electronic device can correspond to a computer such as a desktop computer, laptop computer or PDA, a media player such as a music player, a communication device such as a cellular phone, another input device such as a keyboard, and the like.

As shown in FIG. 22, in this embodiment input device 2230 may include frame 2232 (or support structure) and touch pad 2234. Frame 2232 can provide a structure for supporting the components of the input device. Frame 2232 in the form of a housing can also enclose or contain the components of the input device. The components, which may include touch pad 2234, can correspond to electrical, optical and/or mechanical components for operating input device 2230. Frame 2232 may be a separate component or it may be an integral component of the housing of the electronic device.

Touch pad 2234 can provide location information for an object, such as a finger for example, in contact with or in proximity to the touch pad. This information can be used in combination with information provided by a movement indicator to generate a single command associated with the movement of the touch pad. The touch pad may be used as an input device by itself; for example, the touch pad may be used to scroll through a list of items on the device.

The shape, size and configuration of touch pad 2234 may be widely varied. In addition to the touchpad configurations disclosed above, a conventional touch pad based on the Cartesian coordinate system, or based on a Polar coordinate system can be configured to provide scrolling using rotational movements and can be configured to accept the mutt-touch and gestures, for example those described herein. Furthermore, touch pad 2234 can be used in at least two different modes, which may be referred to as a relative mode and an absolute mode. In absolute mode, touch pad 2234 can, for example, report the absolute coordinates of the location at which it may be touched. For example, these would be "x" and "y" coordinates in the case of a standard Cartesian coordinate system or (r,θ) in the case of a Polar coordinate system. In relative mode, touch pad 2234 can report the direction and/or distance of change, for example, left/right, up/down, and the like. In most cases, the signals produced by touch pad 2234 can direct movement on the display screen in a direction similar to the direction of the finger as it may be moved across the surface of touch pad 2234.

The shape of touch pad 2234 may be widely varied. For example, it may be circular, oval, square, rectangular, triangular, and the like. In general, the outer perimeter can define the working boundary of touch pad 2234. In the embodiment illustrated in FIG. 22, the touch pad may be circular. Circular touch pads can allow a user to continuously swirl a finger in a free manner, i.e., the finger may be rotated through 360 degrees of rotation without stopping. This form of motion can produce incremental or accelerated scrolling through a list of songs being displayed on a display screen, for example. Furthermore, the user may rotate his or her finger tangentially from all sides, thus providing more finger position range. Both of these features may help when performing a scrolling function. Furthermore, the size of touch pad 2234 can accommodate manipulation by a user (e.g., the size of a finger tip or larger).

Touch pad 2234, which can generally take the form of a rigid platform. The rigid platform may be planar, convex or concave, and may include touchable outer surface 2236, which may be textured, for receiving a finger or other object for manipulation of the touch pad. Although not shown in FIG. 22, beneath touchable outer surface 2236 can be a sensor arrangement that may be sensitive to such things as the pressure and movement of a finger thereon. The sensor arrangement may typically include multiple sensors that can be configured to activate as the finger sits on, taps on or passes over them. In the simplest case, an electrical signal can be produced each time the finger is positioned over a sensor. The number of signals in a given time frame may indicate location, direction, speed and acceleration of the finger on touch pad 2234, i.e., the more signals, the more the user moved his or her finger. In most cases, the signals can be monitored by an electronic interface that converts the number, combination and frequency of the signals into location, direction, speed and acceleration information. This information can then be used by the electronic device to perform the desired control function on the display screen. The sensor arrangement may be widely varied. For example, the sensors can be based on resistive sensing, surface acoustic wave sensing, pressure sensing (e.g., strain gauge), optical sensing, capacitive sensing and the like.

In the embodiment illustrated in FIG. 22, touch pad 2234 may be based on capacitive sensing. In most cases, the capacitive touch pad may include a protective shield, one or more electrode layers, a circuit board and associated electronics including an application specific integrated circuit (ASIC). The protective shield can be placed over the electrodes, the electrodes can be mounted on the top surface of the circuit board, and the ASIC can be mounted on the bottom surface of the circuit board. The protective shield may serve to protect the underlayers and to provide a surface for allowing a finger to slide thereon. The surface may generally be smooth so that the finger does not stick to it when moved. The protective shield also may provide an insulating layer between the finger and the electrode layers. The electrode layer may include multiple spatially distinct electrodes. Any suitable number of electrodes can be used. As the number of electrodes increases, the resolution of the touch pad also increases.

In accordance with one embodiment, touch pad 2234 can be movable relative to the frame 2232. This movement can be detected by a movement detector that generates another control signal. For example, touch pad 2234 in the form of the rigid planar platform can rotate, pivot, slide, translate, flex and/or the like relative to frame 2232. Touch pad 2234 can be coupled to frame 2232 and/or it can be movably restrained by frame 2232. For example, touch pad 2234 can be coupled to frame 2232 through axels, pin joints, slider joints, ball and socket joints, flexure joints, magnets, cushions and/or the like. Touch pad 2234 can also float within a space of the frame (e.g., gimbal). It should be noted that input device 2230 may additionally include a combination of joints such as a pivot/translating joint, pivot/flexure joint, pivot/ball and socket joint, translating/flexure joint, and the like to increase the range of movement (e.g., increase the degree of freedom).

When moved, touch pad 2234 can be configured to actuate a movement detector circuit that generates one or more signals. The circuit may generally include one or more movement detectors such as switches, sensors, encoders, and the like.

In the embodiment illustrated in FIG. 22, touch pad 2234 can be part of a depressible platform. The touch pad can operate as a button and perform one or more mechanical clicking actions. Multiple functions or the same function of the device may be accessed by depressing the touch pad 2234 in different locations. A movement detector signals that touch pad 2234 has been depressed, and touch pad 2234 signals a location on the platform that has been touched. By combining both the movement detector signals and touch pad signals, touch pad 2234 acts like multiple buttons such that depressing the touch pad at different locations corresponds to different buttons. As shown in FIGS. 23 and 24, according to one embodiment touch pad 2234 can be capable of moving between an upright position (FIG. 23) and a depressed position (FIG. 24) when a requisite amount of force from finger 2238, palm, hand or other object is applied to touch pad 2234. Touch pad 2234 can be spring biased in the upright position, as for example through a spring member. Touch pad 2234 moves to the depressed position when the spring bias is overcome by an object pressing on touch pad 2234.

As shown in FIG. 23, touch pad 2234 generates tracking signals when an object such as a user's finger is moved over the top surface of the touch pad in the x, y plane. As shown in FIG. 24, in the depressed position (z direction), touch pad 2234 generates positional information and a movement indicator generates a signal indicating that touch pad 2234 has moved. The positional information and the movement indication can be combined to form a button command. Different button commands or the same button command can correspond to depressing touch pad 2234 in different locations. The button commands may be used for various functionalities including, but not limited to, making selections or issuing commands associated with operating an electronic device. For example, in the case of a music player, the button commands may be associated with opening a menu, playing a song, fast forwarding a song, seeking through a menu and the like.

To elaborate, touch pad 2234 can be configured to actuate a movement detector, which together with the touch pad positional information, can form a button command when touch pad 2234 is moved to the depressed position. The movement detector can be located within frame 2232 and coupled to touch pad 2234 and/or frame 2232. The movement detector may be any combination of switches and sensors. Switches can be generally configured to provide pulsed or binary data such as activate (on) or deactivate (off). For example, an underside portion of touch pad 2234 can be configured to contact or engage (and thus activate) a switch when the user presses on touch pad 2234. The sensors, on the other hand, can be generally configured to provide continuous or analog data. For example, the sensor can be configured to measure the position or the amount of tilt of touch pad 2234 relative to the frame when a user presses on the touch pad 2234. Any suitable mechanical, electrical and/or optical switch or sensor may be used. For example, tact switches, force sensitive resistors, pressure sensors, proximity sensors, and the like may be used. In some case, the spring bias for placing touch pad 2234 in the upright position may be provided by a movement detector that includes a spring action. In other embodiments, input device 2230 can include one or more movement detectors in various locations positioned under and/or above touch pad 2234 to form button commands associated with the particular locations in which the movement detector is actuated. Touch pad 2234 may can also be configured to provide a force feedback response.

Figure 25:
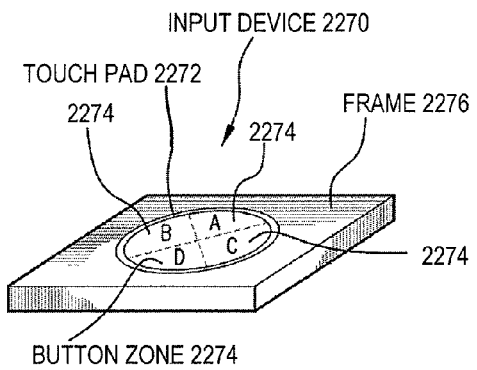
FIG. 25 illustrates an example of an input device.

FIG. 25 illustrates a simplified perspective diagram of input device 2270. Like the input device shown in the embodiment of FIGS. 22-24, this input device 2270 incorporates the functionality of one or more buttons directly into touch pad 2272, i.e., the touch pad acts like a button. In this embodiment, however, touch pad 2272 can be divided into multiple independent and spatially distinct button zones 2274. Button zones 2274 may represent regions of the touch pad 2272 that can be moved by a user to implement distinct button functions or the same button function. The dotted lines may represent areas of touch pad 2272 that make up an individual button zone. Any number of button zones may be used, for example, two or more, four, eight, etc. In the embodiment illustrated in FIG. 25, touch pad 2272 may include four button zones 2274 (i.e., zones A-D).

As should be appreciated, the button functions generated by pressing on each button zone may include selecting an item on the screen, opening a file or document, executing instructions, starting a program, viewing a menu, and/or the like. The button functions may also include functions that make it easier to navigate through the electronic system, as for example, zoom, scroll, open different menus, home the input pointer, perform keyboard related actions such as enter, delete, insert, page up/down, and the like. In the case of a music player, one of the button zones may be used to access a menu on the display screen, a second button zone may be used to seek forward through a list of songs or fast forward through a currently playing song, a third button zone may be used to seek backwards through a list of songs or fast rearward through a currently playing song, and a fourth button zone may be used to pause or stop a song that may be in the process of being played.

To elaborate, touch pad 2272 can be capable of moving relative to frame 2276 so as to create a clicking action. Frame 2276 can be formed from a single component or a combination of assembled components. The clicking action can actuate a movement detector contained inside frame 2276. The movement detector can be configured to sense movements of the button zones during the clicking action and to send a signal corresponding to the movement to the electronic device. For example, the movement detectors may be switches, sensors and/or the like.

In addition, touch pad 2272 can be configured to send positional information on what button zone may be acted on when the clicking action occurs. The positional information can allow the device to determine which button zone to activate when the touch pad is moved relative to the frame.

The movements of each of button zones 2274 may be provided by various rotations, pivots, translations, flexes and the like. In one embodiment, touch pad 2272 can be configured to gimbal relative to frame 2276. By gimbal, it is generally meant that the touch pad 2272 can float in space relative to frame 2276 while still being constrained thereto. The gimbal can allow the touch pad 2272 to move in single or multiple degrees of freedom (DOF) relative to the housing, for example, movements in the x, y and/or z directions and/or rotations about the x, y, and/or z axes ($\theta x \theta y \theta z$).

Figure 26:
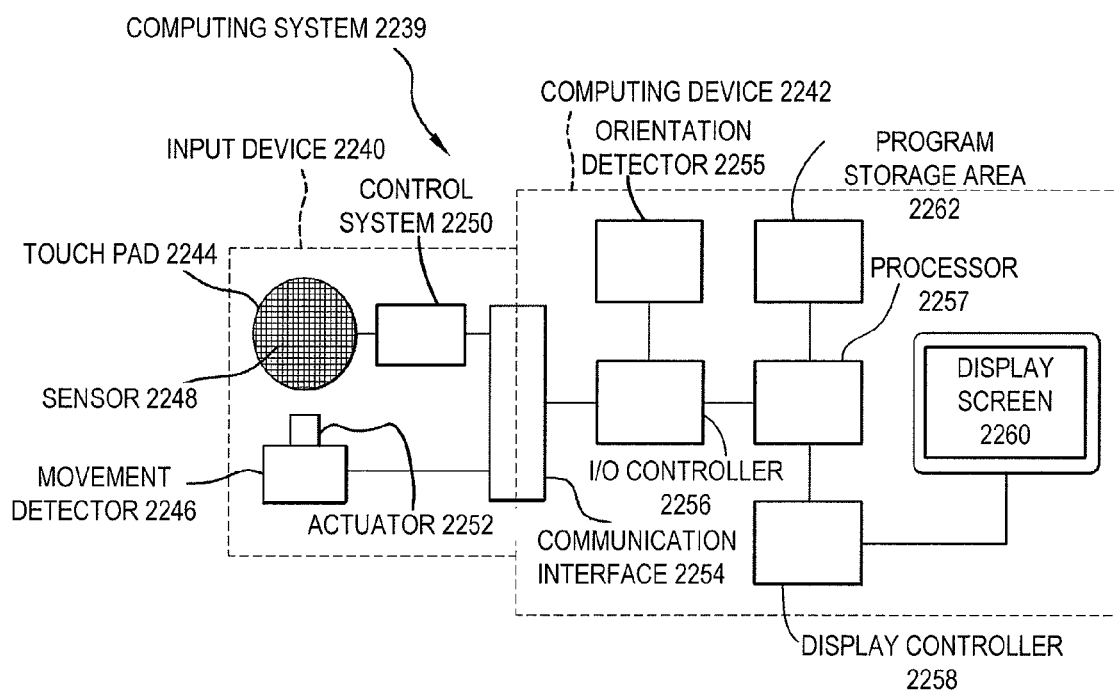
FIG. 26 illustrates an example of a computing system.

FIG. 26 illustrates an example of a simplified block diagram of a computing system 2239. The computing system may generally include input device 2240 operatively connected to computing device 2242. For example, input device 2240 can generally correspond to input device 2230 shown in FIGS. 22-24, and the computing device 2242 can correspond to a computer, PDA, media player or the like. As shown, input device 2240 may include depressible touch pad 2244 and one or more movement detectors 2246. Touch pad 2244 can be configured to generate tracking signals and movement detector 2246 can be configured to generate a movement signal when the touch pad is depressed. Although touch pad 2244 may be widely varied, in this embodiment, touch pad 2244 can include capacitance sensors 2248 and control system 2250 (which can generally correspond to the controller described above) for acquiring position signals from sensors 2248 and supplying the signals to computing device 2242. Control system 2250 can include an application specific integrated circuit (ASIC) that can be configured to monitor the signals from sensors 2248, to compute the absolute location, angular location, direction, speed and/or acceleration of the monitored signals and to report this information to a processor of computing device 2242. Movement detector 2246 may also be widely varied. In this embodiment, however, movement detector 2246 can take the form of a switch that generates a movement signal when touch pad 2244 is depressed. Movement detector 2246 can correspond to a mechanical, electrical or optical style switch. In one particular implementation, movement detector 2246 can be a mechanical style switch that includes protruding actuator 2252 that may be pushed by touch pad 2244 to generate the movement signal. For example, the switch may be a tact or dome switch.

Both touch pad 2244 and movement detector 2246 can be operatively coupled to computing device 2242 through communication interface 2254. The communication interface provides a connection point for direct or indirect connection between the input device and the electronic device. Communication interface 2254 may be wired (wires, cables, connectors) or wireless (e.g., transmitter/receiver).

Referring to computing device 2242, it may include processor 2257 (e.g., CPU or microprocessor) configured to execute instructions and to carry out operations associated with computing device 2242. For example, using instructions retrieved from memory, the processor can control the reception and manipulation of input and output data between components of computing device 2242. Processor 2257 can be configured to receive input from both movement detector 2246 and touch pad 2244 and can form a signal/command that may be dependent upon both of these inputs. In most cases, processor 2257 can execute instruction under the control of an operating system or other software. Processor 2257 may be a single-chip processor or may be implemented with multiple components.

Computing device 2242 may also include input/output (I/O) controller 2256 that can be operatively coupled to processor 2257. (I/O) controller 2256 can be integrated with processor 2257 or it may be a separate component as shown. I/O controller 2256 can generally be configured to control interactions with one or more I/O devices that may be coupled to the computing device 2242, as for example input device 2240 and orientation detector 2255, such as an accelerometer. I/O controller 2256 can generally operate by exchanging data between computing device 2242 and I/O devices that desire to communicate with computing device 2242.

Computing device 2242 may also include display controller 2258 that can be operatively coupled to processor 2257. Display controller 2258 can be integrated with processor 2257 or it may be a separate component as shown. Display controller 2258 can be configured to process display commands to produce text and graphics on display screen 2260. For example, display screen 2260 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like. In the embodiment illustrated in FIG. 26, the display device corresponds to a liquid crystal display (LCD).

In some cases, processor 2257 together with an operating system operates to execute computer code and produce and use data. The computer code and data can reside within program storage area 2262 that may be operatively coupled to processor 2257. Program storage area 2262 can generally provide a place to hold data that may be used by computing device 2242. For example, the program storage area may include Read-Only Memory (ROM), Random-Access Memory (RAM), hard disk drive and/or the like. The computer code and data could also reside on a removable program medium and loaded or installed onto the computing device when needed. In one embodiment, program storage area 2262 can be configured to store information for controlling how the tracking and movement signals generated by the input device may be used, either alone or in combination for example, by computing device 2242 to generate an input command, such as a single button press for example.

FIGS. 27-30 illustrate applications of an input device according to some embodiments of the present disclosure. As previously mentioned, the input devices described herein can be integrated into an electronic device or they can be separate stand alone devices. FIGS. 27-30 show some implementations of input device 2220 integrated into an electronic device. FIG. 27 shows input device 2220 incorporated into media player 2212. FIG. 28 shows input device 2220 incorporated into laptop computer 2214. FIGS. 29 and 30, on the other hand, show some implementations of input device 2220 as a stand alone unit. FIG. 29 shows input device 2220 as a peripheral device that can be connected to desktop computer 2216. FIG. 30 shows input device 2220 as a remote control that wirelessly connects to docking station 2218 with media player 2212 docked therein. It should be noted, however, that in some embodiments the remote control can also be configured to interact with the media player (or other electronic device) directly, thereby eliminating the need for a docking station. It should be noted that these particular embodiments do not limit the present disclosure and that many other devices and configurations may be used.

Referring back to FIG. 27, media player 2212, housing 2222 and display screen 2224 may generally correspond to those described above. As illustrated in the embodiment of FIG. 27, display screen 2224 can be visible to a user of media player 2212 through opening 2225 in housing 2222 and through transparent wall 2226 disposed in front of opening 2225. Although transparent, transparent wall 2226 can be considered part of housing 2222 since it helps to define the shape or form of media player 2212.

Media player 2212 may also include touch pad 2220 such as any of those previously described. Touch pad 2220 can generally include touchable outer surface 2231 for receiving a finger for manipulation on touch pad 2220. Although not illustrated in the embodiment of FIG. 27, beneath touchable outer surface 2231 a sensor arrangement can be configured in a manner as previously described. Information provided by the sensor arrangement can be used by media player 2212 to perform the desired control function on display screen 2224. For example, a user may easily scroll through a list of songs by swirling the finger around touch pad 2220.

In addition to above, the touch pad may also include one or more movable buttons zones A-D as well as a center button E for example. The button zones can be configured to provide one or more dedicated control functions for making selections or issuing commands associated with operating media player 2212. For example, in the case of an MP3 music player, the button functions can be associated with opening a menu, playing a song, fast forwarding a song, seeking through a menu, making selections and the like. In some embodiments, the button functions can be implemented via a mechanical clicking action.

The position of touch pad 2220 relative to housing 2222 may be widely varied. For example, touch pad 2220 can be placed at any surface (e.g., top, side, front, or back) of housing 2222 accessible to a user during manipulation of media player 2212. In some embodiments, touch sensitive surface 2231 of touch pad 2220 can be completely exposed to the user. In the embodiment illustrated in FIG. 27, touch pad 2220 can be located in a lower front area of housing 2222. Furthermore, touch pad 2220 can be recessed below, level with, or extend above the surface of housing 2222. In the embodiment illustrated in FIG. 27, touch sensitive surface 2231 of touch pad 2220 can be substantially flush with an external surface of housing 2222.

The shape of touch pad 2220 may also be widely varied. Although illustrated as circular in the embodiment of FIG. 27, the touch pad can also be square, rectangular, triangular, and the like for example. More particularly, the touch pad can be annular, i.e., shaped like or forming a ring. As such, the inner and outer perimeter of the touch pad can define the working boundary of the touch pad.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in multiple units, or as part of other functional units. As such, the disclosure may be implemented in a single unit or may be physically and functionally distributed between different units and processors.

Note that one or more of the functions described above can be performed by instructions stored in a memory associated with a processor or controller. The instructions can also be stored and/or transported within any computer-readable recorded medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable recorded medium" can be any medium that can contain or store a program for use by or in connection with the instruction execution system, apparatus, or device. The computer readable recorded medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An input device comprising:
   multiple touch sensor elements comprising a first touch sensor element adjacent to a second touch sensor element; and
   a controller configured to scan at least the second touch sensor element, determine if a touch input threshold associated with the second touch sensor element is exceeded, and increase a sensitivity associated with the first touch sensor element in response to the touch input threshold associated with the second touch sensor element being exceeded.

2. The input device of claim 1, wherein the controller is configured to increase the sensitivity by reducing a noise threshold associated with the first touch sensor element.

3. The input device of claim 1, wherein the controller is configured to increase the sensitivity by boosting a signal level associated with the first touch sensor element.

4. The input device of claim 1, wherein the controller is configured to increase the sensitivity based on a signal level associated with the second touch sensor element.

5. The input device of claim 1, wherein the controller is configured to increase the sensitivity based on an ambient temperature associated with the input device.

6. The input device of claim 1 wherein the touch input threshold comprises a predetermined signal level above which a signal level from the second touch sensor element indicates a touch input to the input device.

7. The input device of claim 1 wherein increasing sensitivity of the sensor element comprises at least one of reducing a noise threshold associated with the sensor element and boosting a signal level associated with the sensor element.

8. A method comprising:
   scanning multiple touch sensor elements,
   capturing scan data associated with multiple individual sensor elements;
   implementing an input reporting rule comprising
   reporting an input in response to the scan data indicating (1) a first input signal greater than a first predetermined threshold and associated with a first sensor element and (2) at least a second input signal less than a second predetermined threshold and associated with a second sensor element adjacent to the first sensor element, wherein the second predetermined threshold is less than the first predetermined threshold,
      reporting an input in response to the scan data indicating a single input signal greater than the first predetermined threshold when an input has been reported in a preceding scan cycle, and
      not reporting an input in response to the scan data indicating (1) an input signal greater than the first predetermined threshold and associated with a third sensor element, and (2) no second input signal less than the second predetermined threshold and associated with a fourth sensor element adjacent to the third sensor element and (3) no input having been reported in a preceding scan cycle.

9. The method of claim 8, wherein the input associated with the preceding scan cycle is reported in a location adjacent to a location of the input associated with the single input signal greater than the first predetermined threshold.

10. The method of claim 8, wherein the input associated with the single input signal greater than the first predetermined threshold is reported at a location comprising a centroid of the multiple sensor element associated with the single input signal greater than the first predetermined threshold.

11. The method of claim 8 wherein the first sensor element and the third sensor element are the same and wherein the second sensor element and the fourth sensor element are same.

12. An input device comprising:
   multiple touch sensor elements; and
   a controller configured to scan the multiple touch sensor elements, determine if an input threshold associated with any of the multiple touch sensor elements is exceeded, and increase a sensitivity associated with each of the multiple touch sensor elements in response to an input threshold associated with any of the multiple touch sensor elements being exceeded.

13. The input device of claim 12, wherein the controller is configured to increase the sensitivity by reducing a noise threshold associated with each of the multiple touch sensor elements.

14. The input device of claim 12, wherein the controller is configured to increase the sensitivity by boosting a signal level associated with each of the multiple touch sensor elements.

15. The input device of claim 12, wherein the controller is configured to increase the sensitivity based on a signal level associated with any of the multiple touch sensor elements associated with the exceeded input thresholds.

16. The input device of claim 12, wherein the controller is configured to increase the sensitivity based on an ambient temperature associated with the input device.

17. The input device of claim 12 wherein the touch input threshold comprises a predetermined signal level above which a signal level from the second touch sensor element indicates a touch input to the input device.

18. The input device of claim 12 wherein increasing sensitivity of the sensor element comprises at least one of reducing a noise threshold associated with the sensor element and boosting a signal level associated with the sensor element.

19. An input device comprising:
   multiple touch sensor elements; and
   a controller configured to scan the multiple touch sensor elements, determine if an input threshold associated with any of the multiple touch sensor elements is exceeded, and increase a sensitivity associated with one of the multiple touch sensor elements in response to a noise threshold associated with the one touch sensor element being exceeded.

20. The input device of claim 19, wherein the controller is configured to restore the sensitivity when a signal level associated with the one touch sensor element meets or falls below the noise threshold.

21. The input device of claim 19 wherein the touch input threshold comprises a predetermined signal level above which a signal level from the second touch sensor element indicates a touch input to the input device.

22. The input device of claim 19 wherein increasing sensitivity of the sensor element comprises at least one of reducing a noise threshold associated with the sensor element and boosting a signal level associated with the sensor element.

23. An input device comprising:
   multiple touch sensor elements comprising a first touch sensor element and a second touch sensor element; and
   a controller configured to scan the multiple touch sensor elements and detect an input by performing a sensing operation associated with each of the multiple touch sensor elements, the sensing operation associated with the first touch sensor element being normalized based on a first scale factor and the sensing operation associated with the second touch sensor element being normalized based on a second scale factor.

24. The input device of claim 23, wherein the first scale factor is associated with a noise threshold associated with the first touch sensor element, and the second scale factor is associated with a noise threshold associated with the second touch sensor element.

25. An electronic device comprising:
   an input device comprising multiple touch sensor elements comprising two adjacent touch sensor elements;
   a surface covering the multiple touch sensor elements, the surface comprising a curvature; and
   a controller configured to scan the multiple touch sensor elements, determine if an input threshold associated with any of the multiple touch sensor elements is exceeded, and reduce a noise threshold associated with one of the two adjacent touch sensor elements in response to an input threshold associated with the other of the two adjacent touch sensor elements being exceeded.

26. The electronic device of claim 25, wherein the multiple touch sensor elements are circumferentially arranged relative to a first point.

27. The electronic device of claim 25, wherein the multiple touch sensor elements are arranged in a grid-like pattern.

28. The input device of claim 25 wherein the touch input threshold comprises a predetermined signal level above which a signal level from the second touch sensor element indicates a touch input to the input device.

* * * * *